(12) United States Patent
Glorioso, Jr. et al.

(10) Patent No.: US 8,088,482 B2
(45) Date of Patent: Jan. 3, 2012

(54) EXPANDABLE MICROSPHERES FOR FOAM INSULATION AND METHODS

(75) Inventors: Sammie J. (Joey) Glorioso, Jr., Ridgeland, MS (US); James H. Burgess, Greenville, SC (US); Jiansheng Tang, Mars, PA (US); Victoria L. Dimonie, Bethlehem, PA (US); Andrew Klein, Somerville, NJ (US)

(73) Assignee: IP Rights, LLC, Birmingham, AL (US)

( * ) Notice: Subject to any disclaimer, the term of this patent is extended or adjusted under 35 U.S.C. 154(b) by 895 days.

(21) Appl. No.: 10/478,568

(22) PCT Filed: May 24, 2002

(86) PCT No.: PCT/US02/16620
§ 371 (c)(1),
(2), (4) Date: Nov. 21, 2003

(87) PCT Pub. No.: WO02/096635
PCT Pub. Date: Dec. 5, 2002

(65) Prior Publication Data
US 2005/0079352 A1   Apr. 14, 2005

Related U.S. Application Data

(60) Provisional application No. 60/293,793, filed on May 25, 2001, provisional application No. 60/346,558, filed on Jan. 8, 2002.

(51) Int. Cl.
*B32B 5/16* (2006.01)

(52) U.S. Cl. ............ 428/402; 246/4.1; 246/4.3; 246/4.7; 427/213; 427/213.33; 428/402.21; 428/402.22; 521/56; 521/60

(58) Field of Classification Search .................. 428/402, 428/402.22, 402.21; 427/213.3, 213.33, 427/213; 264/4.1, 4.3, 4.7; 521/56, 60; 246/4.1, 246/4.3, 4.7
See application file for complete search history.

(56) References Cited

U.S. PATENT DOCUMENTS

| 3,615,972 A | 10/1971 | Morehouse, Jr. et al. |
|---|---|---|
| 3,740,359 A | 6/1973 | Garner |
| 3,945,956 A | 3/1976 | Garner |
| 4,055,607 A * | 10/1977 | Sullivan et al. ............... 525/155 |
| 4,179,546 A * | 12/1979 | Garner et al. .................. 521/56 |
| 4,582,756 A | 4/1986 | Niinuma et al. |
| 5,155,138 A | 10/1992 | Lundqvist |
| 5,260,343 A | 11/1993 | Harrison et al. |
| 5,536,756 A | 7/1996 | Kida et al. |
| 5,665,785 A | 9/1997 | McClellan et al. |
| 5,834,526 A | 11/1998 | Wu et al. |
| 5,861,214 A | 1/1999 | Kitano et al. |
| 6,166,109 A | 12/2000 | Spitler et al. |
| 6,235,394 B1 * | 5/2001 | Shimazawa et al. ...... 428/402.21 |
| 6,613,810 B1 * | 9/2003 | Ejiri et al. ...................... 521/56 |
| 7,232,607 B2 * | 6/2007 | Satake et al. ............. 428/402.22 |

FOREIGN PATENT DOCUMENTS

| CA | 2342806 | 3/2000 |
|---|---|---|
| CA | 2360114 | 8/2000 |
| CA | 2447273 | 12/2005 |
| EP | 1 054 034 | 11/2000 |
| EP | 1 059 339 | 12/2000 |
| GB | 1 389 122 | 4/1975 |
| JP | 59-108041 | 6/1984 |
| JP | 05-285376 | 11/1993 |
| JP | 09-019635 | 1/1997 |
| JP | 10-152575 | 6/1998 |
| JP | 11-209504 | 8/1999 |
| JP | 11-322877 | 11/1999 |
| WO | 99/43758 | 9/1999 |
| WO | WO 00/37547 | 6/2000 |
| WO | WO 00/44821 | 8/2000 |

* cited by examiner

*Primary Examiner* — John Cooney
(74) *Attorney, Agent, or Firm* — Volpe and Koenig P.C.

(57) ABSTRACT

Hollow thermoexpandable particles or microspheres are provided that contain hydrocarbon blowing agents and have a shell polymer that can be softened at the onset of the expansion temperature and solidified at a higher temperature (thermoset) in an expanded state. Preferably, the microspheres have a shell of thermally expandable and thermally crosslinkable polymer and a hollow interior that contains a hydrocarbon liquid that boils at a temperature below the heat activated crosslinking temperature of the polymer shell. The crosslinking of the shell polymer during or after expansion, which is heat activated at an elevated temperature, can solidify the shell polymer and, then, maintain the expanded volume of the microspheres. The thermoexpandable thermoset polymer particles are useful in insulation, packaging, for making foam materials such as polyurethane or polyisocyanurate rigid foams. The invented thermoset microspheres can substantially improve the close cell percentage and compressive strength of the foam materials and make the foam manufacturing less hazardous.

35 Claims, 9 Drawing Sheets

| PREFERRED BOARDSTOCK FORMULATIONS | | | | |
|---|---|---|---|---|
| Component | PBW | Min | Max | Pounds |
| Isocyanate (MRP, Bayer) | 241.33 | 191 | 400 | 394.19 |
| Polyester Polyol (Stepan 3152, 2352) | 100.00 | 75 | 125 | 163.34 |
| Polymeric Microspheres | 235.00 | 160 | 310 | 383.85 |
| Expandable Graphite Particles < 200µ ave. size (Graph-Tech Inc) or Carbon Black | 0.00 | 0 | 5 | 0 |
| Phospate/Phosphate Blends (Antiblaze 80, Albright & Wilson) | 15.00 | 10 | 35 | 24.50· |
| Brominated-Ester (Pelron) | 7.50 | 0 | 10 | 12.25 |
| Fire Retardants | 22.5 | 10 | 50 | 36.75 |
| Halogenated Hydrocarbon (134-a,HFC, DuPont) | 0.00 | 0 | 1.0 | 0 |
| Non-Halogenated Hydrocarbon (Pentane, Iso-Cyclopentane Blends, Exxon) | 0.00 | 0 | 10 | 0 |
| Surfactant (8457 Goldsmidth) | 2.00 | 1 | 4 | 3.27 |
| Dispersing Agent (Pelron 344) | 2.90 | 0 | 4.4 | 4.74 |
| Foaming Agent (WATER) | 0.75 | 0 | 1.5 | 1.23 |
| Pottasium Octoate | 6.00 | 3 | 9 | 9.80 |
| P-5,Amine (Polycat 5, Air Products) | 0.12 | 0.07 | 0.17 | 0.20 |
| Pottasium Acetate | 1.62 | 0.87 | 2.37 | 2.65 |
| Catalysts | 7.74 | 3.94 | 11.54 | 12.65 |
| Other Ingredients | 0 | 0 | 100 | 0 |
| | | | Total LBS | 1000.00 |

Figure 12

| PREFERRED BUNSTOCK FORMULATIONS | | | | |
|---|---|---|---|---|
| Component | PBW | Min | Max | Pounds |
| Isocyanate (MRP, Bayer) | 242.17 | 192 | 500 | 398.14 |
| Polyester Polyol (Kosa 2031, Stepan 3152, or Oxid) | 100.00 | 75 | 125 | 164.41 |
| Polymeric Microspheres | 235.00 | 160 | 310 | 386.35 |
| Expandable Graphite Particles < 200μ ave. size (Graph-Tech Inc) or Carbon Black | 0.00 | 0 | 50 | 0 |
| Phosphate / Polymeric Phosphate, amine blends (Antiblaze 80, Albright&Wilson) | 15.00 | 10 | 25 | 24.66 |
| Brominated-Ester (Pelron) | 7.50 | 0 | 10 | 12.33 |
| Fire Retardants | 22.5 | 10 | 85 | 36.99 |
| Surfactant (Goldsmidth 8457, 84PI) | 2.50 | 1.5 | 4.5 | 4.11 |
| Dispersing Agent (Pelron 344) | 2.90 | 1.4 | 4.4 | 4.77 |
| Foaming Agent (WATER) | 0.75 | 0 | 2 | 1.23 |
| Trymer Catalyst (TMR-3, Air Products) Quarternary ammonium salt | 1.33 | 1.0 | 2.5 | 2.19 |
| DMEA, Amine | 0.55 | .25 | 1.0 | 0.90 |
| DEG, Glycol | 0.55 | .25 | 1.0 | 0.90 |
| Catalysts | 2.43 | 1.5 | 4.5 | 3.99 |
| Other Ingredients | 0 | 0 | 100 | 0 |
| | | | Total LBS | 1000.00 |

Figure 13

| Aqueous Phase Components for Examples 70 and 71 | | | | | | |
|---|---|---|---|---|---|---|
| Component | NaCl | DI water | Ludox (30%) | PVAm (7.8%) | Ethylene Glycol | $Na_2Cr_2O_7$ (2.5%) |
| Parts by Wt. | 28.8 | 1440 | 158.4 | 33.24 | 57.6 | 24.48 |

Figure 14

| Oil Phase Components for Example 70 | |
|---|---|
| Component | Parts by Wt. |
| AIBN | 10.1 |
| Acrylonitrile | 172.8 |
| Iso-Pentane | 259.2 |
| TAC | 3.6 |
| Vinylidene Chloride | 835.2 |
| Methyl Acrylate | 75.6 |
| Glycidyl Methacrylate | 25.2 |

| Oil Phase Components for Example 71 | |
|---|---|
| Component | Parts by Wt. |
| AIBN | 10.1 |
| Acrylonitrile | 172.8 |
| Iso-Pentane | 259.2 |
| TAC | 3.6 |
| Vinylidene Chloride | 835.2 |
| Methyl Acrylate | 75.6 |
| Hydroxylpropyl Methacrylate | 25.2 |

Figure 15      Figure 16

EXPANDABLE MICROSPHERES FOR FOAM INSULATION AND METHODS

This application claims priority from U.S. Provisional Application No. 60/293,793, filed May 25, 2001 and U.S. Provisional Application No. 60/346,558, filed Jan. 8, 2002.

FIELD OF THE INVENTION

This invention relates to thermally expandable thermoset polymer particles, and more particularly to such particles that contain a heat-expandable liquid within the particles and a polymer shell which can be crosslinked at an elevated temperature when the particles are expanded or during their expansion. Preferably, the microspheres are prepared using poly(vinyl amine) as co-stabilizer and colloidal silica as stabilizer and are used in the manufacture of foam, particularly rigid polyisocyanurate foam, wherein the microspheres are expanded during the foam manufacturing process.

BACKGROUND

Hollow expandable microspheres containing volatile liquid blowing agents encapsulated therein are beneficially employed as fillers in synthetic resinous castings, as bulking agents in textiles and paper, as thin insulating coatings, as blowing agent for other polymers, and the like. The synthesis of expandable particles is disclosed in a number of patents such as U.S. Pat. Nos. 3,615,972; 4,049,604; 4,016,110; 4,582,756; 5,861,214; 5,155,138; EP 559,254; and PCT Publication No. WO/20465. These publications teach how to synthesize thermoplastic expandable microspheres.

The shells of conventional thermoplastic microspheres are expanded by applying heat, but become softened again and, then, easily broken, when reheated. Conventional expanded thermoplastic polymer shells will also be easily broken when kept at high temperature for an extended amount of time. These characteristics of prior art thermoplastic microspheres substantially limit the applications of thermoexpandable microspheres in the area where closed cell and high mechanical strength are required, such as in making polyurethane and polyisocyanurate rigid foams. The inventors have recognized that it would be desirable to produce thermoexpandable microspheres that can start expansion at a relatively low temperature (e.g., 60° or 70° C.) and have a shell polymer of the microspheres that becomes highly crosslinked at a higher temperature (e.g., 120° or 130° C.) when the microspheres are fully expanded. The crosslinking of the shell polymer is inactive at the onset of the expansion temperature and will be activated at a higher temperature when the microspheres are fully expanded and, then, thermoset the shell of the expended microspheres.

In order to create such desirable microspheres, the inventors have recognized several problems in the conventional manufacture of microspheres themselves.

If the aqueous phase in a hypothetical process used to prepare polymer microspheres is considered, the process looks like a suspension polymerization process, i.e. a water phase will contain a stabilizer, no initiator is present, and an inhibitor is added to the aqueous phase in order to prevent homogenous nucleation from occurring in the water phase, resulting in a broadening of the particle size distribution. The inventors have recognized that stabilization of the growing polymer microspheres can be achieved by the addition of colloidal silica. The colloidal silica stabilizer is just one of several components that are needed to be located at the water/oil interface. A polyester (prepared from a combination of diethanol amine and adipic acid in equimolar proportions) is often recommended as a co-stabilizer when using colloidal silica such as taught by U.S. Pat. Nos. 3,615,972; 4,582,756; and 5,834,526. However, substantial difficulties have been encountered in maintaining the desired quality control of the amine/acid polyester as reported in U.S. Pat. No. 4,016,110. Variation in the properties of the polyester result in batch-to-batch variation of the expandable microspheres prepared using the polyester. For conventional polyester, a pH less than 7 has been recommended to impart good stability to the colloidal silica which exhibited behavior similar to a polyelectrolyte, a polycation in this case. The behavior of the polyelectrolyte at an oppositely charged interface depends on the concentration of the polymer added to the system. At low polyelectrolyte concentrations, bridging occurs between particles, and agglomeration of the colloidal silica particles takes place. The configuration of the polyelectrolyte in the adsorbed layer is dramatically affected by the presence of electrolytes in the aqueous phase. Significant flocculation will be obtained with polyelectrolytes of high molar mass at low polyelectrolyte concentration. Thus, the inventors recognize the molecular weight of the polyelectrolyte and the stability of the molecular weight during the polymerization process are very important. However, a polyester structure in the backbone is very sensitive to hydrolysis due to the low pH, high temperature, and the amount of water. Thus, it would be desirable if there were available an improved co-stabilizer when colloidal silica is used in the preparation of polymer microspheres.

The removal of stabilizer used in the preparation of microspheres are usually difficult as described in U.S. Pat. Nos. 5,155,138 and 5,834,526. The remaining colloidal silica on the microspheres after polymerization can influence the removal of water and the expansion of the microspheres. Co-stabilizer plays an important role in the washing off of the colloidal silica stabilizer. As recognized by the inventors, some applications require that the microspheres contain very low water content. Thus, the inventors have recognized the desirability of using a co-stabilizer that can make it easy to wash off the stabilizer/co-stabilizer after polymerization of the polymer particles, resulting in a more simple process and lower water content in the resulting microspheres.

In one application, the microspheres are used in the manufacture of synthetic foam. Foams and processes for their production are well known in the art. Such foams are typically produced by reacting ingredients such as a polyisocyanate with an isocyanate reactive material such as a polyol in the presence of a blowing agent.

Synthetic foams have many uses and are produced in many forms. Rigid foam insulation panels are used in the construction of buildings. Foam bun stock is used for freezer insulation. Flexible foam is used in the manufacture of automobiles and furniture. Shaped foam products are used for building facades and ornamental effects for both interior and exterior uses.

Foam products are generally highly flammable when made solely out of their basic components. A variety of materials have been used in the past for imparting fire resistance to foams. For example, standard liquid flame retardants such as TRIS (-chloro-2-propyl) phosphate products, commercially available as ANTI-BLAZE 80 from Albright and Wilson and as PCF from Akzo Nobel have been conventionally used to increase the fire resistance of the foam. Such additives can be used to produce Factory Mutual Class 1 rated foam when organic halogenated hydrocarbons, such as 1,1-dichloro-1-fluorethane (HCFC-141b) are used as the primary blowing agent.

Since the use of certain halogenated hydrocarbons may have detrimental environmental effects, it is also desirable to provide foam made with a non-halogenated hydrocarbon as the primary blowing agent. However, similar foams made with non-halogenated hydrocarbons, such as iso-pentane and/or cyclopentane, used as the primary blowing agent fail to produce Factory Mutual Class 1 rated foam. In such cases, the use of expandable graphite as a fire retardant for polymer foams can be used as disclosed in International Publication No. WO 01/72863 A1.

Manufacturing foam with a non-halogenated hydrocarbon, such as iso-pentane, as the primary blowing agent conventionally requires expensive safety measures to be taken to avoid the fire and explain hazzard inherent with storing such blowing agents. Applicants have recognized that the benefits of using non-halogenated hydrocarbons in the manufacture of foam can be realized without the conventional safety hazzards through the uses of the inventive microspheres which encapsulates that highly flammable material.

SUMMARY

Hollow thermoexpandable particles or microspheres are provided that contain hydrocarbon blowing agents and have a shell polymer that can be softened at the onset of the expansion temperature and solidified at a higher temperature (thermoset) in an expanded state. Such a particle is advantageous for use in foam applications where close cell and mechanical strength of the foams are important.

Preferably, the thermoexpandable, thermoset hollow particles have a generally spherical shape and are between 0.1 to 150 micrometers in size. The shell polymer preferably contains 0.5 to 20 wt % of thermally crosslinkable monomer units based on the polymer weight. The volume of the hollow portion is preferably 5 to 50% of the total volume; and has encapsulated within the hollow portion about 5 to 70 wt %, based on total weight of particle of hydrocarbon, fluid of between 3 and 7 carbons which has a boiling point between about $-60°$ C. and $70°$ C. The fluid's boiling point is below the melting point of the non-thermoset shell polymer.

Another aspect of the invention is the process by which the novel particles are prepared. It has been discovered that high extent of encapsulation of blowing agents, symmetrical single droplet encapsulation, and low extent of premature crosslinking can be achieved when synthesizing the particles using two level polymerization temperatures (low and high temperature polymerization process).

The inventive microspheres are advantageously used to make foam. The encapsulated blowing agent provides a relatively safe delivery of this volatile material to the foam making process while providing structural benefits. Preferably, a polyurethane and/or polyisocyanurate foam is made using expandable microspheres which encapsulate a primary blowing agent. By expanding during the foam making process, the microspheres function as a blowing agent. The foam preferably has at least 10% by weight expandable microspheres which encapsulate a non-halogenated hydrocarbon chemical or a non-halogenated hydrocarbon chemical blend and less than 2% by weight of any non-encapsulated blowing agents.

By adjusting surface characteristics, the polymeric shell of the inventive microspheres become anchored in the foam through network crosslinking before expansion of the microspheres. This enhances structural stability of the rigid foam while colloidal silica is a preferred stabilizer used in making the polymeric microspheres, silica on the microsphere shell can inhibit the network crosslinking of the microspheres within the foam. Thus, the use of a hydrogen peroxide treatment on the microspheres, such as disclosed in U.S. Pat. No. 4,179,546, aids in silica removal which in turn promotes microsphere network crosslinking with the foam in the foam manufacturing process.

Preferably, two different average sizes of microspheres are used when making boardstock or bunstock foam to enhance structural rigidity and strength. Preferably, at least 30% of the microspheres have a relatively small average unexpanded diameter with a standard deviation less than 3 microns and at least 30% of the microspheres have a relatively large average unexpanded diameter with a standard deviation less than 9 microns. The unexpanded diameter of the larger microspheres is preferably at between 10 and 200 microns least and is 1.5 times greater than the unexpanded diameter of the smaller microspheres. The foam may have at least 45% of the microspheres having the smaller average unexpanded diameter with a standard deviation less than 2 microns and at least 45% of the microspheres having the larger average unexpanded diameter with a standard deviation less than 8 microns where the larger diameter is between 10 and 100 microns and is at least two times greater than the smaller diameter.

For best results, the foam is produced through mixing the constituent materials, including the expandable microspheres using a screw extruder. Alternatively, conventional mixing can be used for the foam manufacturing process.

It is an object of the invention to provide various methods for making foams including the use of an extruder and the use of microspheres which encapsulate non-halogenated hydrocarbon agents to reduce the degree of hazardous manufacturing conditions.

Other objects and advantages of the present invention will become apparent through a description of the presently preferred embodiments.

BRIEF DESCRIPTION OF THE DRAWINGS

FIG. 12 is a table of preferred boardstock formulations.

FIG. 13 is a table of preferred bunstock formulations.

FIG. 14 is a table of a preferred aqueous phase formulation used for Examples 70-71.

FIG. 15 is a table of a preferred oil phase formulation used for Example 70.

FIG. 16 is a table of a preferred oil phase formulation used for Example 71.

DETAILED DESCRIPTION OF THE PREFERRED EMBODIMENTS

Figure 1:
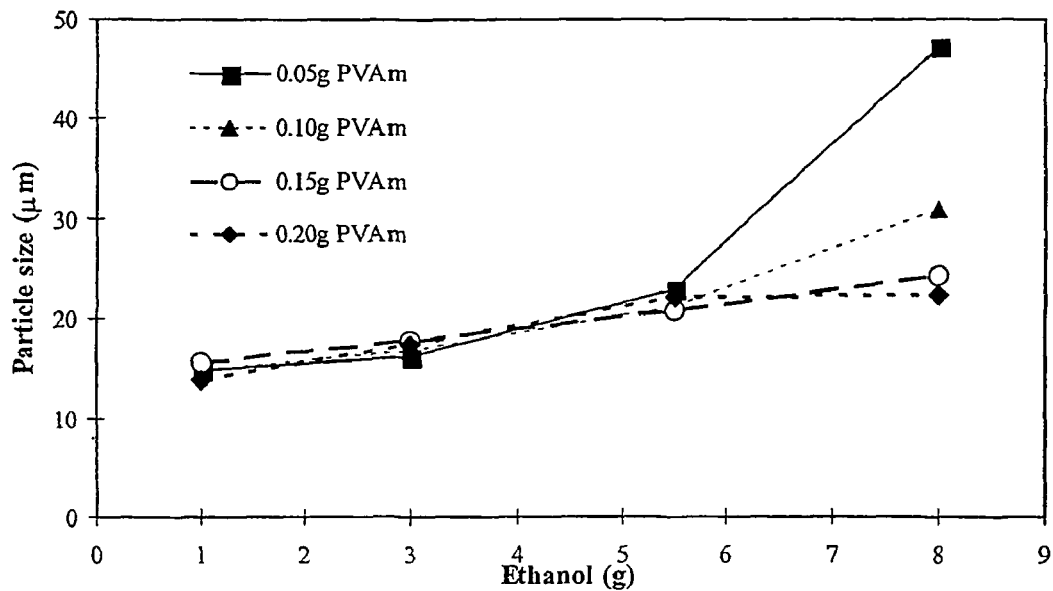
FIG. 1 is a graph illustrating the effect of the amount of ethanol and PVAm amount on microsphere size.

Expandable microspheres have an expandable polymer shell encapsulating therein a droplet of a liquid expanding agent such as a low boiling hydrocarbon or other volatile material that is generally a nonsolvent for the polymer. On heating the expandable microspheres to a temperature sufficient to cause heat plastification of the shell, the microspheres expand to form a hollow gas or vapor filled polymeric shell several times the diameter of the unexpanded microspheres.

The shell polymer may contain heat activatible crosslinking agents that remain inert at a temperature lower than the crosslinking temperature, which is higher than the softening temperature of the shell polymer. The softening temperature is equatable to the glass transition temperature of the expandable microsphere shell.

When temperature reaches the onset point of the heat activating crosslinking or above, the heat activatible crosslinking agents crosslink, resulting in solidification of the shell polymer at high temperature (higher than the expansion temperature). The special shell polymer make the invented microspheres possess special expansion behavior: they expand in a manor that is similar to that of conventional thermoplastic microspheres when they are exposed at a temperature higher than the softening point of the shell polymer and lower than the onset of the heat activating crosslinking; their shell polymer expands and at the same time crosslinks when they are exposed at a temperature higher than the onset of the heat activating crosslinking; they expand to maximum expansion ratio and then the shell polymer solidifies, maintaining the expanded volume of the microspheres when they are first exposed at a temperature higher than the softening point of the shell polymer and then exposed at a temperature higher than the onset of the heat activating crosslinking when the microspheres are fully expanded. As produced, the unexpanded particles are preferably spherical. During expansion, the spherical shape is substantially maintained if the encapsulation of the volatile liquid is symmetrical and the polymer shell is homogeneous in composition.

The heat activatible crosslinking agents, when used, are preferably organic compounds containing one kind of polymerizable unsaturated double bonds and one kind of functional groups, such as N-methylol acrylamide, -isobutoxymethyl) acrylamide, methylolmethacrylamide, isobutoxymethylacrylamide, glycidol methacrylate, glycidyl methacrylate, glycidyl acrylate, dimethylaminoethyl methacrylate, acetoacetoxyethyl methacrylate, and the like. These functional groups become pendent ones on the shell polymer backbones when unsaturated double bonds have polymerized and the shell of the microspheres have formed. These pendent functional groups are inert at low temperature and can react with each other at elevated temperature when the microspheres fully expand to form crosslinked network and thermoset the expanded microspheres.

The unexpanded microspheres generally have a number average diameter of between about 1 and 200 microns, preferably 1 to 100 microns, and most preferable 1-50 microns. The particle sizes and the size distributions are measured by Horiba LA-910 Laser Scattering Particle Size Distribution Analyzer, which is able to measure a wide range of particle diameters from very small (<1.0 micron) up to large particles (1,000 microns).

The volatile hydrocarbon liquid will be retained in the hollow portion just after expansion. Upon becoming rigid by crosslinking or cooling, the microspheres of the present invention become impermeable to gas exchange and retain their impermeability characteristics during aging. This is advantageous in reducing hazardous conditions in the manufacture of foam, since storage and processing foam using highly flammable/explosive hydrocarbon materials, such as iso pentane, as a separate component can be greatly reduce or eliminated.

The preferred expandable thermoset polymer that is used in making the inventive microspheres is an organic polymer made from copolymerization of bi- or multi-functional monomers such as n-methylol acrylamide, glycidol methacrylate, n-isobutoxylmethyl acrylamide, dimethylaminoethyl methacrylate, and the like, preferably n-methylol acrylamide with one or two monofunctional monomers selected from:

(1) nitrile containing compounds such as acrylonitrile, methacrylonitrile, and the like,
(2) alkenyl aromatic compounds such as styrene, omethylstyrene, m-methylstyrene, p-methylstyrene, ethylstyrene, vinyl-xylene, chlorostyrene, bromostyrene, and the like,
(3) acrylate or methacrylate containing compounds, such as alkyl acrylates, alkyl methacrylates, wherein the alkyl group has carbon number from 1 to 25, aromatic acrylates, aromatic methacrylates, di-acrylate, di-methacrylate, poly-acrylates and polymethacrylates monomers, and many other functionality containing compounds like isobornyl acrylate or methacrylate, or some oligometric acrylate or methacrylate compounds,
(4) vinyl alkyl ester compounds, such as vinyl acetate, wherein the alkyl groups is from carbon number 1 to 25,
(5) vinyl alkyl ether compounds, such as butyl vinyl ethyl, wherein the alkyl group is from carbon number 1 to 25;
(6) halogenated monomers such as vinyl chloride, vinylidene chloride, vinyl bromide, and the like.

The glass transition temperature (Tg) of the shell copolymer before its heat activated crosslinking can be adjusted by the copolymer composition (the ratio of high Tg and low Tg components) to prepare the copolymer shell with specific softening point before heat activated crosslinking.

A small amount of a normal crosslinking agent (different from the heat activatible crosslinking agent) is preferably used to provide slightly crosslinked shell polymer. This provides the polymer microspheres with a rubbery plateau region. The rubbery plateau region can be extended to relatively higher temperature to increase the melting point without modifying its initial onset point of glass transition by using the aforementioned normal crosslinking agent. Preferred normal crosslinking agents are organic compound with two unsaturated double bonds such as triallyl cyanurate, hexamethylene dimethacrylate, ethylene glycol dimethacrylate, trimethylolpropane triacrylate, allyl methacrylate, and the like, preferably triallyl cyanurate The glass transition temperature and the melting point of the copolymer shell is determined using differential scanning calorimetry (DSC).

The encapsulated volatile liquid can be an organic compound or the mixture of several organic compounds of between 3 and 7 carbon atoms that have a normal boiling point between −60° C. and 70° C., such as butane, pentane, hexane, heptane, isobutene, isopentane, neopentane, cyclopropane, cyclobutane, cyclopropane, and the like, preferably isopentane. The blowing hydrocarbon is chosen so that it is gaseous at a temperature below the glass transition temperature of the thermoplastic copolymer.

The free radical polymerization initiator of the invention can be any organic compound that is capable of generating free radicals at certain temperature range. Typical examples include organic peroxides and azo initiators such as azobiscompounds.

Microspheres without Heat Activating Crosslink Agent

To prepare the low temperature expandable microspheres of the invention without a heat activated crosslinking agent, an oil mixture is prepared containing the monomers from which the thermoplastic is made, the volatile organic liquid, the cross-linking agent, and a free radical polymerization initiator. Generally, the amounts of ingredients in this oil mixture will be 50 to 95% by weight of the monomer, 5 to 50% by weight of the volatile organic liquid, 0 to 0.5% by weight of the cross-linking agent, and 0.1 to 3% by weight of the free radical polymerization initiator.

An aqueous phase is prepared by mixing water, a stabilizer of colloidal particle dispersion, such as a fumed silica or silica gel or other inorganic colloidal particles, a co-stabilizer such as poly(vinyl amine) with different molecular weight between 500 and 250,000 g/mol, preferably 25,000 g/mol, and an aqueous soluble free radical inhibitor such as sodium or potassium dichoromate. The pH of the aqueous mixture is adjusted between 3 and 4, preferably 3.5 by using an acid, such as hydrochloric acid, acetic acid, hydronitric acid, and the like. The composition of the aqueous phase affects the size of the oil droplets when the oil phase and aqueous phase are mixed. The term "oil" is used herein as generic to liquids that are insoluble in water.

The two liquid mixtures are mixed by strong mechanical shear force and the mixture is allowed to coalesce. The oil and aqueous phases are mixed in a ratio of between 1:25 to 2:1 oil mixture to aqueous mixture. Depending on the ratio and the composition of the oil and aqueous mixtures, the size of the droplets of polymerizable oil liquid can be controlled. The size of these droplets, together with polymerization conditions, will determine the size of the beads of the unexpanded microspheres.

The solid colloidal particles that are used in the aqueous mixture must be insoluble but dispersible in water and both insoluble and nondispersible in, but wettable by, the polymerizable liquid. The solid colloids must be much more hydrophilic than eleophilic so as to remain dispersed wholly within the aqueous liquid. The solid colloids preferred in this invention are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight cross-linked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloid that is employed is usually such as corresponds to from about 0.01 to about 10 or more grams per 100 cubic centimeters of the polymerizable liquid.

In order to function as a stabilizer for the polymerizable droplets, it is important that the solid colloid tends to collect within the aqueous liquid at the liquid-liquid interface, i.e. on the surface of the oil droplets. In many instances, it is desirable to add a "co-stabilizer" material to the aqueous composition to drive the particles of the solid colloid to the liquid-liquid interface. Usually, the co-stabilizers are organic materials that have affinity for the solid colloid and also for the oil droplets and that are capable of making the solid colloid more eleophilic. The affinity for the oil surface is usually due to some organic portion of the co-stabilizer molecule while the affinity for the solid colloid is usually due to opposite changes. For example, negatively charged colloids, such as bentonite, are promoted by positively charged co-stabilizers such as tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, and polyethylenimine.

Usually, the co-stabilizer is used only to the extent of a few parts per million of aqueous medium, although larger proportions can often be tolerated. Although the percentage of the co-stabilizer to be used is very little, it imparts a significant influence in the synthesis of the expandable microspheres, such as in the extent of the encapsulation of the blowing agent, reproducibility of the synthesis, removal of the colloidal particles after polymerization, and in the drying process. U.S. Pat. No. 4,798,691 reported a good polyester co-stabilizer which is the condensation product of diethanol amine and adipic acid. However, this co-stabilizer has many drawbacks. For example, this co-stabilizer is easy to be hydrolyzed when dissolved in water, especially under the conditions of low pH and high temperature. The hydrolysis will change the molecular weight of the polyester co-stabilizer, resulting in poor reproducibility in the synthesis of microspheres using polyester co-stabilizer.

Poly(vinyl amine) co-stabilizer with different molecular weight developed by this invention has proved to be a better co-stabilizer. It provides very good reproducibility of the synthesis of expandable microspheres. It has better promotion ability to drive the colloidal silica to the liquid-liquid interface which improves the stability of the system and the encapsulation. Poly(vinyl amine) co-stabilizer can also be easily removed when the polymerization ends, which makes the subsequent drying process simple since it can be air-dried. This results in very low water content in the final microsphere products. The poly(vinyl amine) used in this invention is preferably of molecular weight between 500 g/mol to 250,000 g/mol, preferably 25,000 g/mol.

The oil droplets dispersed in the aqueous medium are polymerized in a pressure reactor under an agitation that allows proper heat transfer between the mixture and the reactor. Polymerization temperature substantially influence the quality of the resulting expandable microspheres. The polymerization temperature preferably ranges from 5° to 150° C. for 0.1 to 48 hours.

The load of the reactor will influence the synthesis, too. The higher the initial pressure caused by some inert gases such as nitrogen, argon, and the like, the larger extent of the encapsulation of the volatile organic liquid. In the case that the volatile monomers are used such as vinylidene chloride and the like, the initial pressure provided by an inert gas will reduce the amount of the volatile monomer in the gaseous space of the reactor, which will remain the composition of the oil droplets. The initial pressure used in this invention is preferably between 0 to 500 atmospheres, which can be selected based on the polymerization temperature.

The particles can be removed from the reaction mixture by filtration, by sedimentation, or by coagulation using a solvent, such as an alcohol; washed with water and dried. If the product is to isolated as unexpanded microspheres, it can be dried at or below the temperature that at least 5° C. below the glass transition temperature of the shell copolymer using air flow.

The low temperature expandable thermoplastic microspheres are useful in insulation, packaging, for making foam materials such as polyurethane or polyisocyanurate rigid foams. In particular, making such foams using the methods set forth in U.S. Pat. No. 5,723,506 (Glorioso et al.), where the microspheres of the present application are used as filler material while also serving to deliver the blowing agent.

Example 1

An oil phase was prepared using 69.6 parts of vinylidene chloride, 14.4 parts of acrylonitrile, 4.2 parts of methyl acrylate, 0.2 parts of triallyl cyanurate, 21.6 parts of iso-pentane, and 0.84 parts of 2,2'-azobis(isobutyronitrile). Separately, an aqueous phase mixture was prepared utilizing 120 parts of deionized water, 18 parts of colloidal silica dispersion (30 weight percent solid available under the trade name of "Ludox HS-30"), 0.84 parts of a solution containing 8.2 weight percent of poly(vinyl amine) of 25,000 g/mol molecular weight, and 2.04 parts of a solution containing 2.5 weight percent sodium dichromate. The pH value of the aqueous phase mixture was adjusted between 3 and 4, preferable 3.5 with hydrochloric acid. After the oil and aqueous phases were mixed, the mixture was violently mixed by a homogenizer, OMNI PRO 300 type, available from PRO Scientific Inc. Preferably mixing is at a speed between 6000 and 8000 rpm for 3 to 15 minutes in an ice water bath at temperature between 2° and 5° C. The resultant mixture was immediately transferred to a pressure reactor and sealed. The reaction mixture was maintained at a temperature of 60° C. for 16 hours under mild rotation of 40 rpm. The reactor was filled to a level of 90%. The obtained produce was filtrated, washed, and dried at room temperature. The unexpanded microspheres obtained had average particle size between 5 and 50 microns determined by Horiba LA-910 Laser Scattering Particle Size Distribution Analyzer (which is the method for determination of particles size in all examples), and gave the maximum volumetric expansion ratio of about 70 times when samples are placed in a thin and long glass tube, uniform in certain diameter, heated in water bath at a temperature of 80° C. The volume expansion ratio is determined by marking the height of total unexpanded microspheres residing inside the thin glass tube and the height of the expanded microspheres inside the tube. Assuming uniformity in glass tube diameter, initial volume before thermal expansion and final volume after thermal expansion can be determined. The volume expansion ratio is essentially the height ratio if the diameter of the glass tubing remains constant, which is the case for all examples hereafter. When observed under the optical microscope equipped with a heating stage that can control the heating rate, the microspheres synthesized above started expansion at a temperature between 65° and 70° C. and can sustain at a temperature up to 120° C. when heating rate is 6° C./min. In Examples 1-9, the temperature where the microspheres start to expand and the highest temperature that the expanded microspheres can still sustain are all measured by the method described above. The air-dried microspheres had a water content of about 0.5 weight percent. The water content was measured by monitoring the weight loss when the air-dried microspheres were further dried in vacuum over for 72 hours, which is the case for all Examples 1-9.

Example 2

The procedure of Example 1 was repeated with the exception that there is no triallyl cyanurate in the oil mixture. The obtained microspheres had similar particles size and water content to those prepared in Example 1, and had a maximum volumetric expansion ratio of about 52 times when heated in water bath at a temperature of 80° C., and started expansion at a temperature about 65° C. and sustained at a temperature of 85° C. when heating rate is 6° C./min.

Example 3

The procedure of Example 1 was repeated with the exception that 0.2 parts of triallyl cyanurate was replaced by 0.14 parts of allyl methacrylate in the oil mixture. The obtained microspheres had similar particles size and water content to those prepared in Example 1, and had a maximum volumetric expansion ratio of about 60 times when heated in water bath at a temperature of 80° C.

Example 4

The procedure of Example 1 was repeated with the exception that 0.2 parts of triallyl cyanurate was replaced by 0.18 parts of ethylene glycol dimethacrylate and 0.84 parts of 2,2'-azobis(isobutyronitrile) was replaced by 1.18 parts of 2,2'-azobis(isobutyronitrile). The obtained microspheres had similar particles size and water content to those prepared in Example 1, and had a maximum volumetric expansion ratio of about 60 times when heated in water bath at a temperature of 80° C.

Example 5

The procedure of Example 1 was repeated with the exception that 0.2 parts of triallyl cyanurate was replaced by 0.13 parts of hexamethylene dimethacrylate. The obtained microspheres had similar particles size and water content to those prepared in Example 1, and had a maximum volumetric expansion ratio of about 70 times when heated in water bath at a temperature of 80° C.

Example 6

The procedure of Example 1 was repeated with the exception that 0.2 parts of triallyl cyanurate was replaced by 0.12 parts of trimethylolpropane triacrylate. The obtained microspheres had similar particles size and water content to those prepared in Example 1, and had a maximum volumetric expansion ration of about 45 times when heated in water bath at a temperature of 80° C.

Example 7

The procedure of Example 1 was repeated with the exception that 0.84 parts of 2,2'-azobis(isobutyronitrile) was replaced by 1.8 parts of t-amyl peroxyneodecanoate (75 weight percent solid dissolved in mineral oil available under the trade name of "Lupersol 54B M75"), and the polymerization was performed in Example 1, had particle size between 1 and 40 microns, and had a maximum volumetric expansion ratio of about 80 times when heated in water bath at a temperature of 80° C.

Example 8

The procedure of Example 7 was repeated with the exception that an initial pressure of 3 atmospheres was applied using nitrogen gas before the polymerization started. The obtained microspheres had similar particles size and water content to those prepared in Example 7, and had a maximum volumetric expansion ratio of about 90 times when heated in water bath at a temperature of 80° C.

Example 9

The procedure of Example 1 was repeated with the exception that (69.6 parts of vinylidene chloride, 14.4 parts of acrylonitrile, 4.2 parts of methyl acrylate) was replaced by (72 parts of vinylidene chloride and 12 parts of acrylonitrile). The obtained microspheres had similar particles size and water content to those prepared in Example 1, and had a maximum volumetric expansion ratio of about 46 times when heated in water bath at a temperature of 80° C.

Microspheres with Heat Activated Crosslinking Agent

To prepare the thermoexpandable thermoset microspheres of the invention with a heat activated crosslinking agent, an oil mixture is prepared containing the monomers from which the shell polymer is made, the hydrocarbon liquid, the normal crosslinking agent, the heat activatible crosslinking agent, and a free radical polymerization initiator. Generally, the amounts of ingredients in this oil mixture will be 50 to 95% by weight of the monomer, 5 to 50% by weight of the volatile hydrocarbon liquid, 0 to 0.5% by weight of the normal crosslinking agent, 1 to 10% by weight of the heat activatable crossliniing agent, and 0.1 to 3% by weight of the free radical polymerization initiator.

An aqueous phase is prepared by mixing water, a stabilizer of colloidal particle dispersion, such as a fumed silica or silica gel or other inorganic colloidal particles, a costabilizer such as poly(vinyl amine) with molecular weight between 500 and 250,000 g/mol, and an aqueous soluble free radical inhibitor such as sodium or potassium dichromate. The pH of the aqueous mixture is adjusted between 3 and 4, preferably 3.5 by using an acid, such as hydrochloric acid, acetic acid, hydronitric acid, and the like, preferably hydrochloric acid. The composition of the aqueous phase affects the size of the oil droplets when the oil phase and aqueous phase are mixed. The term "oil" is used herein as generic to liquids that are insoluble in water.

The two liquid mixtures are mixed by strong mechanical shear force and the mixture is allowed to coalesce. The oil and aqueous phases are mixed in a ratio of between 1:25 to 2:1 oil mixture to aqueous mixture. Depending on the ratio and the composition of the oil and aqueous mixtures, the size of the droplets of polymerizable oil liquid can be controlled. The size of these droplets, together with polymerization conditions, will determine the size of the beads of the unexpanded microspheres.

The preferred solid colloidal particles, a stabilizer, and co-stabilizer for the microspheres remain the same for microspheres having a heat activated crosslinking agent as explained above for microspheres without such agent.

Oil droplets are dispersed in an aqueous medium and are polymerized in a pressure reactor under an agitation that allows proper heat transfer between the mixture and the reactor. Polymerization temperature substantially influence the quality of the resulting expandable microspheres. Low temperature favors the encapsulation of volatile hydrocarbon liquid, the stability of the suspension system, and the protection of the heat activatable crosslinking groups, but decreases the uniformity of the composition of the shell copolymer. High temperature has the opposite effects. A process that polymerizes the oil droplets initially at a lower temperature and then elevates the temperature to a higher level was developed using a combination of initiators with different half-lives to produce the microspheres of Examples 15-17, below. The polymerization temperature preferably ranges from 5 to 150° C. for 0.1 to 48 hours.

The load of the reactor will also influence microsphere synthesis. The higher the initial pressure caused by some inert gases such as nitrogen, argon, and the like, the larger extent of the encapsulation of the hydrocarbon liquid. Where volatile monomers are used, such as vinylidene chloride and the like, the initial pressure provided by an inert gas will reduce the amount of the volatile monomer in the gaseous space of the reactor, which will maintain the composition of the oil droplets. The initial pressure is preferably between 0 to 500 atmospheres and can be selected based on the polymerization temperature. The pressure is preferably high enough to maintain the blowing agent in a liquid form at the polymerization temperature.

The particles can be removed from the reaction mixture by filtration, by sedimentation, or by coagulation using a solvent, such as an alcohol; washed with water and dried. If the particles are to be isolated as unexpanded microspheres, they are preferably dried using air flow at or below a temperature that is at least 5° C. below the glass transition temperature of the shell copolymer before its heat activated crosslinking.

Thermoexpandable thermoset microspheres have a variety of uses, particularly in insulation, packaging, and for making foam materials such as polyurethane or polyisocyanurate rigid foams. For use in foam manufacture, the microspheres are preferably treated with hydrogen peroxide, such as disclosed in U.S. Pat. No. 4,179,546. This treatment assists in silica removal from the polymeric shells of the microspheres which in turn promotes network crosslinking in foam manufacture.

Example 10

An oil phase was prepared using 835.2 parts of vinylidene chloride, 172.8 parts of acrylonitrile, 120.0 parts of a water solution containing 48 weight percent of N-methylol acrylamide, 3.6 parts of triallyl cyanurate, 259.2 parts of iso-pentane, and 21.6 parts of t-amyl peroxyneodecanoate (75 weight percent solid dissolved in mineral oil available under the trade name of "Lupersol"). Separately, an aqueous phase mixture was prepared utilizing 1440 parts of deionized water, 216 parts of colloidal silica dispersion (30 weight percent solid available under the trade name of "Ludox HS-30"), 10.08 parts of a solution containing 8.2 weight percent of poly(vinyl amine) of 25,000 g/mol molecular weight, and 24.48 parts of a solution containing 2.5 weight percent sodium dichromate. The pH value of the aqueous phase mixture was adjusted between 3 and 4, preferable 3.5 with hydrochloric acid. After the oil and aqueous phases were mixed, the mixture was violently mixed by a homogenizer, OMNI PRO 300 type, available from PRO Scientific Inc. Preferably, mixing is at a speed between 6000 and 8000 rpm for 5 to 30 minutes in an ice water bath at temperature between 2 and 5° C. The resultant mixture was immediately transferred to a 3-liter pressure reactor with anchor impeller and sealed with no additional pressure being applied. The reaction mixture was maintained at a temperature of 45° C. for 16 hours under mild agitation speed of 40 rpm to polymerize the oil droplets. The reactor was filled to a level of 90%. The obtained product was filtrated, washed, and dried at room temperature.

The unexpanded microspheres obtained had number average particles size between 1 and 30 microns determined by Horiba LA-910 Laser Scattering Particle Size Distribution Analyzer (which is the method for determination of particles size in all examples), and gave the maximum volumetric expansion ratio of about 90 times when samples are placed in a thin and long glass tube, uniform in certain diameter, heated in water bath at a temperature of 80° C. The retention of the expanded state reflects the occurrence of crosslinking and thermosetting of the microsphere shells.

The volume expansion ratio is determined by marking the height of total unexpanded microspheres residing inside the thin glass tube and the height of the expanded microspheres inside the tube. Assuming uniformity in glass tube diameter, initial volume before thermal expansion and final volume after thermal expansion can be determined. The volume expansion ratio is essentially the height ratio if the diameter of the glass tubing remains constant, which is the case for all examples hereafter.

When observed under the optical microscope equipped with a heating stage that can control the heating rate, the microspheres synthesized above started expansion at a temperature between 69 and 75° C. and can sustain at a temperature up to 140° C. when heating rate is 6° C./min. The increase in the maximum sustain temperature of the expanded microspheres indicates the heat activated crosslinking occurs. In all the examples hereafter, the temperature where the microspheres start to expand and the highest temperature that the expanded microspheres can still sustain are all measured by the method described above. The air-dried microspheres had a water content of about 0.6 weight percent. The water content was measured by monitoring the weight loss when the air-dried microspheres were further dried in vacuum oven for 72 hours, which is the case for all examples hereafter.

Example 11

The procedure of Example 10 was repeated with the exception that 120 parts of a water solution containing 48 weight percent of N-methylol acrylamide was mixed in the aqueous phase instead of in the oil phase. Similar results as those in Example 10 were obtained.

Example 12

The procedure of Example 10 was repeated with the exception that 120 parts of was replaced by 60 parts of a solution containing 48 weight percent of N-methylol acrylamide and 48.12 parts of methyl acrylate in oil mixture. The obtained microspheres had similar particles size and water content to those prepared in Example 10, and had a maximum volumetric expansion ratio of about 85 times when heated in water bath at a temperature of 80° C. When observed under the optical microscope equipped with a heating stage that can control the heating rate, the microspheres synthesized above started expansion at a temperature 75° C. and can sustain at a temperature up to 130° C. when heating rate is 6° C./min.

Example 13

The procedure of Example 10 was repeated with the exception that 120 parts of a water solution containing 48 weight percent of N-methylol acrylamide was replaced by 50 parts of glycidol methacrylate. The obtained microspheres had similar particles size and water content to those prepared in Example 10, and had a maximum volumetric expansion ratio of about 70 times when heated in water bath at a temperature of 80° C. When observed under the optical microscope equipped with a heating stage that can control the heating rate, the microspheres synthesized above started expansion at a temperature 72° C. and can sustain at a temperature up to 128° C. when heating rate is 6° C./min.

Example 14

The procedure of Example 13 was repeated with the exception that 50 parts of glycidol methacrylate was replaced by 50 parts of N-isobutoxymethyl acrylamide. The obtained microspheres had similar particles size, sustain temperature, and water content to those prepared in Example 13, and had a maximum volumetric expansion ratio of about 65 times when heated in water bath at a temperature of 80° C.

Example 15

The procedure of Example 10 was repeated with the exception that 21.6 parts of t-amyl peroxyneodecanoate (75 weight percent solid dissolved in mineral oil available under the trade name of "Lupersol") was replaced by (5.52 parts of 2,2'-azobis(siobutyronitrile) and 12.0 part of the Lupersol), 120.0 parts of a water solution containing 48 weight percent of N-methylol acrylamide was replaced by 50 parts of methyl acrylate, and the oil droplets dispersed in the aqueous phase were first polymerized at a temperature of 45° C. for 12 hours and then further polymerized at a temperature of 65° C. for another 8 hours. The obtained microspheres had similar particles size and water content to those prepared in Example 10, and had a maximum volumetric expansion ratio of about 55 times when heated in water bath at a temperature of 80° C. Some small particles did not expand.

Example 16

The procedure of Example 15 was repeated with the exception that a initial pressure of 3 atmospheres was applied using nitrogen gas at the end of the first 12-hour polymerization. The obtained microspheres had similar particles size and water content to those prepared in Example 15, and had a maximum volumetric expansion ratio of about 76 times when heated in water bath at a temperature of 80° C.

Example 17

The procedure of Example 16 was repeated with the exception that 50 parts of methyl acrylate was replaced by 120.0 parts of a water solution containing 48 weight percent of N-methylol acrylamide. The obtained microspheres had similar particles size and water content to those prepared in Example 10, and had a maximum volumetric expansion ratio of about 90 times when heated in water bath at a temperature of 80° C. When observed under the optical microscope equipped with a heating stage that can control the heating rate, the microspheres synthesized above started expansion at a temperature 70° C. and can sustain at a temperature up to 145° C. when heating rate is 6° C./min.

Control of Microsphere Size and Size Distribution

Experimentation showed that the composition of the aqueous phase was found to have great effect on the morphology and expansion properties of the microspheres. The amount and type of alcohol used in the suspension polymerization recipe had the most significant effect. Methanol, and ethanol, in particular, result in an increase in the particle size and narrow the particle size distribution. An optimum amount of methanol or ethanol brings about a sharp expansion of the particles during heating resulting from the uniformity of the particle properties. However, too much methanol or ethanol produces particles with a honeycomb structure, which do not maintain the particle integrity at higher temperatures and lead to a poorer expansion.

The use of butanol did not improve the thermal-expansion properties. The use of increasing amounts of poly(vinyl amine) (PVAm), which acted as a steric stabilizer together with the colloidal silica, produced microspheres that were smaller and more uniform in size. However, the molecular weight of the poly(vinyl amine) did not affect the particle properties. The amount of Ludox® colloidal silica had little effect on the particle size and size distribution, but it did affect the degree of expansion of the particles. Smaller amounts of Ludox® resulted in better expansion. The level of salt did not have any effect on the particle size, but it appeared to broaden the particle size distribution and increase the onset temperature of both expansion and shrinkage.

Higher agitation speeds in the preparation of the dispersion produced particles with narrower size distributions. This may be attributed to a narrower initial droplet size distribution. The agitation time had little effect on the particle size, but it appeared to narrow the particle size distribution.

The presence of shear during an $H_2O_2$ post-surface treatment enhances expansion properties. Air-dried particles bring about better expansion after $H_2O_2$ surface treatment compared to an original slurry directly taken from reactor.

A systematic investigation of the effect of the amount of PVAm and ethanol on the particle properties was carried out and an optimum region was found for producing particles with excellent expansion properties.

The microspheres were made using a suspension polymerization process. In the suspension polymerization process, the stabilized monomer droplets are polymerized directly to form polymer particles; therefore, the monomer droplet can be viewed as a small bulk polymerization reactor. With the assumption that the polymerization is subject to a free-radical mechanism, the bulk polymerization rate equation can be applied to a suspension polymerization system at low to moderate conversions:

$$R_p = k_p[M]\left(\frac{2fk_d[I]}{k_t}\right)^{0.5} \quad \text{Equation (1)}$$

where $R_p$ is the rate of polymerization; [M] and [I] are the monomer and initiator concentrations, respectively; $k_p$, $k_d$ and $k_t$ are the rate constants for propagation, initiation and termination respectively; and f is the free-radical efficiency.

Suspension polymerization kinetics consists of three stages. In stage 1, the viscosity of the organic phase is low, the droplet size is small and the particle size distribution (PSD) is narrow, depending on the amount of agitation and concentration of suspending agent. Also the suspension is quite stable, the droplet population dynamics (break-up/coalescence of droplets) are fast, and the quasi-steady state assumption is valid. In stage 2, which starts around 20-35% conversion, the droplets become highly viscous and viscoelastic, the breakage and coalescence rates decrease. The extent of droplet breakage slows down faster than the droplet coalescence rate, and the average droplet size increases. If coalescence dominates, or if stage 2 lasts too long, a broader PSD or even agglomeration will occur. In stage 3, the conversions are even higher and the particles become solid. Monomer diffusion limitations become evident and the propagation rate decreases.

Many parameters can influence the microsphere size, size distribution, and morphology. The initial droplet size and size distribution during preparation of the dispersion are crucial to the final particle size and size distribution. When using communication method to make an emulsion, assuming the absence of recoalescence of the droplets, the final average droplet size, d, is given by $$d = \frac{6\phi M_s \Gamma_{max}}{W_s} \quad \text{Equation (2)}$$

where: $\phi$ is the volume fraction of the oil phase, Ws is the mass of the stabilizer added per unit volume of emulsion, and Ms is the molecular weight of the stabilizer molecules. $\Gamma_{max}$ is the monolayer volume of the adsorbed amount in the corresponding adsorption isotherm of the stabilizer at the oil/water interface.

The degree to which the polymer dissolves, swells, or precipitates in the monomer phase, the presence of monomer diluents or cross-linking monomer, and the concentration and type of oil-soluble initiator can all greatly influence the surface and bulk morphology of the product particles.

Morehouse, Jr, D. S., in U.S. Pat. No. 3,615,972, describes a suspension polymerization process that was employed to produce expandable thermoplastic polymer particles containing a volatile fluid foaming agent. The polymerization began with an aqueous dispersion of: (1) organic monomers that were suitable for polymerization to form a thermoplastic resinous polymer having the desired physical properties; (2) a liquid blowing agent which exerts little solvent action on the resulting polymer and in a quantity in excess of that which is soluble in the polymer; (3) a dispersion stabilizing material which is utilized to maintain the dispersion, subsequently polymerizing the monomeric material to solid spherical particles having the liquid-blowing agent encapsulated therein as a distinct and separate phase.

Various organic materials can be used as monomers in this process. Generally, they may be: (1) alkenyle aromatic monomers; (2) acrylate monomers alone, or in combination with the allcenyl aromatic monomers; (3) halogenated vinyl compounds, e.g. vinylidene chloride, acrylonitrile with vinyl chloride; (4) esters, e.g. vinyl acetate, vinyl butyrate; and (5) copolymerizable acids, e.g. acrylic acid, methacrylic acid.

The blowing agents may fall into the following types of organic materials: (1) aliphatic hydrocarbons, e.g. ethane, ethylene, propane, isopentene; (2) chlorofluorocarbons, e.g. $CCl_3F$, $CCl_2F_2$, $CClF_3$—$CCl_2F_2$; (3) tetra alkyl silanes, e.g. tetramethyl silane. The boiling point of such blowing agents at atmospheric pressure should be about the same temperature range or lower than the softening point of the resinous material employed.

In the following Examples, an inorganic stabilizer, colloidal silica (Ludox® HS, Sigma-Aldrich), and water-soluble polymer, poly(vinyl amine) (PVAm, BASF) were used. PVAM was employed to farther protect the monomer droplets against coalescence by increasing the viscosity of the system and acted as a bridge between silica colloidal particles and the monomer droplets. Sometimes a small amount of electrolyte, e.g. water-soluble ionizable alkali, acid or salt, is used to drive the solid colloids to the oil-water interface; in the following Examples common salt (NaCl) was employed. Oil-soluble initiators such as benzyl peroxide, or azo initiators such as 2,2'-azobis(isobutyronitrile) (AIBN) can be used; as noted below AIBN was used in the following Examples. Since it is desirable that the polymerization only takes place within the monomer droplets, $Na_2Cr_2O_7$ was used to inhibit any aqueous phase polymerization.

In the monomeric phase, it is beneficial to add a difunctional monomer or cross-linking agent, such as TAC (triallyl cyanurate) to increase the melt or flow viscosity of the polymeric composition at temperatures high enough to cause volatilization of the blowing agent and subsequent deformation of the originally formed sphere into a larger hollow sphere after particle expansion. As noted below, TAC was used in the following Examples.

Garner, J. L., in U.S. Pat. No. 3,945,956, reported that the addition of an alcohol to the polymerization system can result in the formation of larger particles with narrower size distributions and improved expansion characteristics. Ejiri, M., in European Patent No. 1,054,034 A1, disclosed that the presence of at least one compound selected from the group consisting of alkali metal nitrites, stannous-chloride, stannic chloride, water-soluble ascorbic acids and boric acid can produce expandable microspheres with extremely sharp PSDs, and excellent expansion properties.

Examples 18-69

Vinylidene chloride (VDC, Sigma-Aldrich), acrylonitrile (AN, Sigma-Aldrich) and methyl acrylate (MeA, Sigma-Aldrich) monomers together with triallyl cyanurate (TAC, Monomer-Polymer & Dajac Labs Inc.) and 2-methyl butane (iso-pentane, Sigma-Aldrich) were mixed with 2,2'-azobis (isobutyronitrile) (AIBN, Sigma-Aldrich) to form the oil phase. Deionized (DI) water, colloidal silica (Ludox®, Sigma-Aldrich), NaCl (>99.9%, Fisher), $Na_2Cr_2O_7$ (Sigma-Aldrich), poly(vinyl amine) (PVAm, MW=15,000, 50,000, or 250,000 g/mol, from BASF), and alcohols (methanol, ethanol, n-propanol, -butanol and hexanol all from Sigma-Aldrich) comprise the aqueous phase. All of these chemicals are used as received.

Generally following the methods described in U.S. Pat. No. 3,945,956 and U.S. Pat. No. 3,615,972, the following standard recipe was used for the preparation of microspheres and investigation of the effects of different variables in the following Examples.

TABLES 1 and 2

| Standard Recipe for Examples 18-69 | | | |
|---|---|---|---|
| Aqueous Phase | | Oil Phase | |
| Chemical | Amount (g) | Chemical | Amount (g) |
| Deionized water | 200.0 | VDC | 116.0 |
| Ludox ® colloidal silica (35 wt %) | 30.0 | AN | 24.0 |
| NaCl | 4.0 | MeA | 7.0 |
| $Na_2Cr_2O_7$(2.5 wt %) | 3.4 | AIBN | 1.4 |
| PVAm* | 0.12 | TAC | 0.35 |
| Alcohol | 2.0 | Isopentane | 36 |

*The amount of PVAm is for the solid polymers.

All of the organic components of the oil phase were weighted and mixed in advance, and stored chilled in ice before mixing with the aqueous phase. The aqueous phase was prepared by adding Ludox®, $Na_2Cr_2O_7$, and NaCl to DI water, and then carefully mixing in the PVAm. The pH of the mixture was adjusted from about 7 to 3.5 by adding HCl. Then the two phases were mixed together in a 1 L glass reactor (Lab Glass), and simultaneously the alcohol was added into the mixture with mild agitation of the six-bladed steel propeller. To prevent monomer from vaporizing, the reactor was kept cold by immersing it in ice throughout the preparation process. The mixture was agitated at a certain agitation speed (i.e., from 1000 to 1960 rpm) for about 15-30 minutes until the two phases were totally emulsified. The resulting dispersion was then put into a pressure bottle (250 mL, Lab Glass) for polymerization. The reaction was carried out in a bottle polymerization unit (rotation speed is about 30 rpm) at 60° C. for about 20 hours in order to achieve high conversion. The resulting slurry was first filtered through a 280-mesh screen to remove any aggregated large beads, then collected on a filter paper and dried in the air.

The produced polymer particles were not expandable unless they were treated by hydrogen peroxide. To do this, 50 g of the microsphere slurry (40 wt % microspheres) was heated to 50° C. for 3.5 hour and treated with 0.4 g hydrogen peroxide solution. In the following Examples, most surface treatments were carried out in a bottle polymerization unit. Under a microscope, the shell of the treated microspheres was transparent and was thermally expandable as compared to the untreated particles.

Static light scattering (Horiba, model LA-910) was used to measure the particle size and size distribution. Deionized water was used as the dispersion medium. The particle sizes are plotted in frequency (%), f, and cumulative % of undersize particles, u, versus particle diameter.

The expansion properties of the product particles were investigated in two ways: tube expansion and observation with an optical microscope using a hot stage attachment.

In the tube expansion procedure, 0.20 g of the dried microsphere powder was placed in a 10 mL graduated tube, which was then immersed and heated in an 80° C. water bath. Instead of measuring the expansion ratio, the maximum expanded volume was used as the criteria of expansion.

The second method utilized the direct visual observation of particles under an optical microscope with a hot stage attachment that can gradually increase the temperature. By this means, the onset temperature of expansion, $T_{o.e.}$, termination temperature of expansion, $T_{t.e.}$, and the onset temperature of shrinkage (loss of gas), $T_{o.s.}$ were obtained.

Several sets of screening examples were designed and carried out. The design used here was based on Plackett-Burman's basic designs for 8, 12, 16, 20, or up to 100 experiments. In each of these, N-1 factors can be studied. In general, one determines how many variables need to be included and then one chooses the design that most nearly satisfies that number. Any factors not assigned can be listed as dummies.

For a certain variable A in an eight experiment design, its effect on the response ($E_A$) is simply the difference between the average value of the response for the 4 runs at high level (R(+)) and the average value of the response for the 4 runs at low level, (R(-)), as illustrated:

$$E_A = \frac{R(+)}{4} - \frac{R(-)}{4} \qquad \text{Equation (3)}$$

Dummy variables can be used to estimate the variance of an effect ($V_{eff}$), say:

$$V_{eff} = \frac{\sum (E_{dummy})^2}{n} \qquad \text{Equation (4)}$$

where n is the number of dummy variables. Employing $V_{eff}$ to calculate the standard error of an effect (S.$E_{eff}$) by:

$$S.E_{eff} = \sqrt{V_{eff}} \qquad \text{Equation (5)}$$

The significance of each effect can be determined using a t-test $$t = \frac{\text{effect}}{s \cdot E_{eff}} = \frac{\text{effect}}{\sqrt{V_{eff}}} \qquad \text{Equation (6)}$$

Based on the Plackett-Burman basic design for 8 experiments, five variables and five responses in the first set of screening Examples were chosen as shown in Table 3.

TABLE 3

Screening Examples 18-29: Design and Results.

| Ex. | Sample | A | B | C | D | E | (F) | (G) | PS (μm) | PSD (μm) | PSD/PS | Expd. Vol. (mL) | $T_{o.e}$ (°C.) | $T_{o.s.}$ (°C.) |
|---|---|---|---|---|---|---|---|---|---|---|---|---|---|---|
| 18 | Y017  | + | + | + | − | + | − | − | 27.2 | 7.0  | 0.26 | 7.0 | 74 | 95  |
| 19 | Y018  | − | + | + | + | − | + | − | 18.2 | 5.5  | 0.31 | 9.2 | 75 | 94  |
| 20 | Y019  | − | − | + | + | + | − | + | 13.4 | 3.1  | 0.24 | 5.5 | 76 | 103 |
| 21 | Y020  | + | − | − | + | + | + | − | 12.2 | 3.9  | 0.32 | 0.8 | 74 | 98  |
| 22 | Y021  | − | + | − | − | + | + | + | 20.0 | 6.0  | 0.30 | 9.8 | 74 | 100 |
| 23 | Y022  | + | − | + | − | − | + | + | 14.6 | 11.2 | 0.77 | 0.7 | 71 | 78  |
| 24 | Y023  | + | + | − | + | − | − | + | 26.7 | 7.1  | 0.27 | 6.6 | 69 | 94  |
| 25 | Y024  | − | − | − | − | − | − | − | 14.0 | 3.5  | 0.25 | 7.8 | 74 | 103 |
| 26 | Y017' | + | + | + | − | + | − | − | 23.8 | 7.8  | 0.33 | 7.8 | 74 | 95  |
| 27 | Y018' | − | + | + | + | − | + | − | 16.6 | 6.1  | 0.37 | 6.9 | 75 | 96  |
| 28 | Y021' | − | + | − | − | + | + | + | 17.5 | 7.3  | 0.42 | 9.5 | 74 | 102 |
| 29 | Y022' | + | − | + | − | − | + | + | 14.7 | 6.7  | 0.46 | 1.0 | 69 | 72  |

\* A = level of alcohol    (+) 3% wt (6 g)    (−) 1% wt (2 g) based on water
   B = type of alcohol    (+) Methyl    (−) Hexanol
   C = MW of PVAm    (+) 250K    (−) 15K
   D = agitation speed    (+) 1960 rpm    (−) 1500 rpm
   E = agitation time    (+) 30 min    (−) 10 min
\*\*Variables (F) and (G) are dummies, which do not represent any real parameter.
\*\*\*Samples Y017', Y018' and Y021', Y022' used the same recipes as Y017, Y018, Y021 and Y022, they were repeated because the latter ones had large tails in the particle size distribution.
\*\*\*\*PS is mean particle size, PSD is standard deviation of size distribution, PSD/PS is relative deviation of size distribution.

The significance of the investigated variables, namely, level and type of alcohol, molecular weight of PVAm, agitation speed and agitation time, was calculated and is reflected in Table 4 and Table 5.

TABLE 4

Significance of Variables (t-value), based on Ex. 20, 21 and 24-28

| Variable | PS (μm) | PSD (μm) | Expd. Vol. (mL) | $T_{o.e.}$ (°C.) | $T_{o.s.}$ (°C.) |
|---|---|---|---|---|---|
| A | 1.29  | 1.65  | −3.59 | −2.2 | −1.70 |
| B | 3.23  | 0.58  | 3.72  | −0.6 | 0.05  |
| C | 0.04  | 0.93  | −0.54 | 1    | −1.21 |
| D | −0.45 | −1.2  | −0.67 | 0.2  | 0.63  |
| E | −0.06 | −1.08 | −0.25 | 1.8  | 1.31  |
| (F) | −1.39 | 0.87 | −1.34 | 0.2 | −1.21 |
| (G) | 0.26  | 1.11 | −0.46 | −1.4 | −0.73 |

TABLE 5

Significance of Variables (t-value), based on Examples 18-25

| Variable | PS (μm) | PSD (μm) | Expd. Vol. (mL) | $T_{o.e.}$ (°C.) | $T_{o.s.}$ (°C.) |
|---|---|---|---|---|---|
| A | 1.26  | 1.85  | −2.00 | −2.03 | −1.86 |
| B | 2.38  | 4.27  | 2.33  | −0.16 | 0.45  |
| C | −0.16 | 0.88  | −0.52 | 0.47  | −1.28 |
| D | −0.09 | −1.69 | −0.94 | 0.47  | 0.79  |
| E | −0.39 | −0.66 | 0.19  | 1.72  | 1.36  |
| (F) | −1.34 | 1.10 | −1.41 | −0.16 | −1.12 |
| (G) | 0.46  | 0.88 | −0.10 | −1.41 | −0.87 |

From Tables 3, 4 and 5, the following is observed:

(1) Adding methanol can effectively increase the particle size and value of PSD. But if the value of PSD/PS (relative deviation of size distribution) is considered instead of PSD (standard deviation of size distribution) as the criteria of the distribution broadness, it is discovered that actually adding methanol can improve the uniformity of the particle size, which is consistent with the reported results.

(2) Methanol, which has higher solubility parameter, $\delta=14.5$ $(cal/cm^3)^{1/2}$, than hexanol does, $\delta=10.7$ $(cal/cm^3)^{1/2}$, is a more effective additive in terms of increasing the size of the microspheres, and also results in a broader absolute but narrower relative distribution, i.e. the average PSD/PS for the samples prepared using methanol is 0.320, whereas for the samples prepared using hexanol, it is 0.406.

(3) Adding a suitable amount of alcohol can improve the extent of expansion due to the resulting larger particle size and narrower size distribution. As was observed, samples prepared with 2 g methanol had the largest expanded volume. However, the use of too much methanol in this system may produce particles having a honeycomb structure, where expansion and loss of gas occurs in the same temperature range, 74 to 80° C., resulting in worse expansion.

(4) The higher agitation speed produced particles with a narrower distribution, since the significance of the agitation speed on the particle size distribution is about −1.2~−1.7. This may be attributed to the narrower initial droplet size distribution obtained in the emulsification process. The agitation time has little, if any, effect on the particle size, but it can improve the particle uniformity. However, it was surprising that agitation conditions did not affect the particle size.

(5) The molecular weight of the PVAm is not a significant parameter for all responses because all the t-value of this variable are small compared to those of other variables. This independence of particle size on the molecular weight of the stabilizer is not consistent with equation (2), which predicts that the use of a higher molecular weight PVAm would result in larger particles.

Knowing that methanol can improve both the uniformity and the expansion properties of the particles, and the solubility parameters of the alcohols is rather important, the following further examples reflect the influence of other types of alcohols.

U.S. Pat. No. 3,945,956 discloses that hydroxyl containing compounds improve both the morphology and expansion characteristics of the expandable microspheres, such as particle size, size uniformity, temperature range of expansion and expandability. The applicable alcohols are represented as R—(OH)$_n$, where R is an alkyl radical containing from 1 to 6 carbon atoms and n is an integer from 1 to 4.

The definition of solubility parameter is given in the form:

$$\delta = C^{1/2} \quad \text{Equation (7)}$$

$$C = [(\Delta H - RT)/V_m]^{1/2} \quad \text{Equation (8)}$$

where δ is the solubility parameter, C is the cohesive energy density, ΔH is the heat of vaporization, R is the gas constant, T is the temperature, $V_m$ is the molar volume of the solvent.

The solubility parameter can be estimated from a theoretical calculation:

$$\delta = (\rho \Sigma G)/M \quad \text{Equation (9)}$$

where ρ is the solvent density, G is the group molar attraction constants at 25° C., M is molecular weight of the solvent.

TABLE 6

Physical Properties of Normal Alcohols

| N ($C_nH_{2n+2}O$) | ρ (g/cm³) | M (g/mol.) | δ (calculated) | δ (CRC Handbook) |
|---|---|---|---|---|
| 1 | 0.791 | 32 | 10.87 | 14.5 |
| 2 | 0.794 | 46 | 9.89 | 10.0 |
| 3 | 0.804 | 60 | 9.46 | 10.5 |
| 4 | 0.810 | 74 | 9.18 | 13.6 |
| 5 | 0.811 | 88 | 8.96 | 11.6 |
| 6 | 0.814 | 102 | 8.82 | 10.7 |

In order to examine the effect of the solubility parameters and higher amounts of alcohol, ethanol and 1-butanol were selected as the tested alcohols, and the level of the alcohols was increased in the following Examples 27-34. Together with the alcohol, the effect of the amount of Ludox®, the ratio of PVAm/Ludox®, and NaCl was investigated. The results are collected in Table 7.

TABLE 7

Screening Examples 30-37

| Ex. | Sample | A | B | C | D | E | (F) | (G) | PS (μm) | PSD (μm) | Expd. Vol (mL) | $T_{o.e.}$ (° C.) | $T_{o.s.}$ (° C.) |
|---|---|---|---|---|---|---|---|---|---|---|---|---|---|
| 30 | Y0252 | + | + | + | − | + | − | − | 15.7 | 5.5 | 1.1 | 72 | 74 |
| 31 | Y0262 | − | + | + | + | − | + | − | * | * | * | * | * |
| 32 | Y0272 | − | − | + | + | + | − | + | * | * | * | * | * |
| 33 | Y0282 | + | − | − | + | + | + | − | 16.1 | 6.7 | 9.9 | 73 | 98 |
| 34 | Y0292 | − | + | − | − | + | + | + | 14.1 | 5.6 | 5.3 | 76 | 100 |
| 35 | Y0302 | + | − | + | − | − | + | + | 11.8 | 4.4 | 0.6 | 74 | 78 |
| 36 | Y0312 | + | + | − | + | − | − | + | 29.8 | 9.3 | 6.8 | 72 | 84 |
| 37 | Y0322 | − | − | − | − | − | − | − | 20.2 | 7.0 | 9.8 | 74 | 95 |

A = level of Ludox (+) 38 g (30 wt %) (−) 22 g (30% wt)
B = ratio of silica to PVAm (+) 75 (−) 37.5
(standard ratio of silica/PVAm = 30 g × 30%/0.12 g = 75)
C = type of alcohol (+)Butanol (−) Ethanol
D = level of alcohol (+)10 g (5%) (−) 6 g (3%)
E = level of salt (+)10 g (−) 4 g
*Samples Y0262, Y0272 indicated as "*" were Examples resulting in coagulation during polymerization and could not give any response.

For this set of examples, the following was observed:

(1) Samples Y026 and Y027 coagulated during polymerization. Noting that they both have 10 g butanol in their system, it is believed that butanol, having a higher solubility parameter, may dramatically decrease the interfacial tension and further destabilize the emulsion system.

(2) All samples containing butanol had poor expansion properties, observation under an optical microscope indicated that a large amount of particles did not contain isopentane droplets and could not expand; those particles containing isopentane could expand but also shrank below 80° C.

(3) Adding ethanol can effectively increase the particle size and improve the expansion.

Two additional Example sets reflected in Tables 8 and 9 varied, respectively: (1) lowering the high level of butanol from 5 wt. % to 4 wt. % (8 g)(Examples 38-39); and (2) decreasing the amount of butanol from 5 wt. % to 1 wt. % and take 1 wt. % as (+) (Examples 40-46). Example 38 failed, when the stabilizer level was low (amount of Ludox®=22 g, silica/PVAm=75) in sample Y0263, since the system was not stable.

TABLE 8

Examples 38-39 with Lowered Butanol Amount

| Ex. | Sample | A | B | C | D | E | (F) | (G) | PS (μm) | PSD (μm) | Expd. Vol. (mL) | $T_{o.e.}$ | $T_{o.s.}$ |
|---|---|---|---|---|---|---|---|---|---|---|---|---|---|
| 1 | Y0263 | − | + | + | + | − | + | − | * | * | * | * | * |
| 2 | Y0273 | − | − | + | + | + | − | + | 12.5 | 4.8 | 0.5 (no exp) | * | * |

In the second additional set, samples Y026, Y027, Y028 and Y031 were redone. There was no coagulation during any polymerization. The responses were measured and collected together with Y025, Y029, Y030, Y032 to make a whole group, as set forth in Screening Examples 40-47, shown in Table 9.

TABLE 9

Screening Examples 40-47

| Ex. | Sample | A | B | C | D | E | (F) | (G) | PS (μm) | PSD (μm) | PSD/PS | Expd. Vol. (mL) | $T_{o.e}$ (°C.) | $T_{o.s.}$ (°C.) |
|---|---|---|---|---|---|---|---|---|---|---|---|---|---|---|
| 40 | Y025 | + | + | + | − | + | − | − | 15.7 | 5.5 | 0.35 | 1.1 | 72 | 74 |
| 41 | Y026 | − | + | + | + | − | + | − | 11.6 | 4.3 | 0.37 | 7.7 | 72 | 98 |
| 42 | Y027 | − | − | + | + | + | − | + | 11.9 | 4.6 | 0.39 | 7.6 | 73 | 98 |
| 43 | Y028 | + | − | − | + | + | + | − | 12.4 | 5.3 | 0.43 | 8.7 | 74 | 98 |
| 44 | Y029 | − | + | − | − | + | + | + | 21.0 | 7.4 | 0.35 | 10.5 | 76 | 100 |
| 45 | Y030 | + | − | + | − | − | + | + | 11.8 | 4.4 | 0.37 | 0.6 | 74 | 78 |
| 46 | Y031 | + | + | − | + | − | − | + | 16.7 | 5.5 | 0.33 | 9.5 | 74 | 100 |
| 47 | Y032 | − | − | − | − | − | − | − | 20.2 | 7.0 | 0.35 | 9.8 | 74 | 95 |

A = level of Ludox (+) 38 g (30 wt %) (−) 22 g (30% wt)
B = ratio of silica/PVAm (+) 75 (−) 37.5
C = type of alcohol (+) Butanol (−) Ethanol
D = level of alcohol (+) 2 g (1%) (−) 6 g (3%)
E = level of salt (+) 10 g (−) 4 g

TABLE 10

Significance (t-value) of Variables of Screening Examples 40-47

| Variable | PS (μm) | PSD/PS | Expd. Vol. (mL) | $T_{o.e.}$ | $T_{o.s.}$ |
|---|---|---|---|---|---|
| A | −1.46 | 0.27 | −21.6 | −2.03 | −1.86 |
| B | 1.573 | −1.5 | 2.88 | −0.16 | 0.45 |
| C | −3.48 | 0.28 | −29.53 | 0.47 | −1.28 |
| D | −2.908 | 1.06 | 15.80 | 0.47 | 0.79 |
| E | 0.13 | 1.12 | 0.41 | 1.72 | 1.36 |
| (F) | −1.39 | 1.27 | −0.69 | −0.16 | −1.12 |
| (G) | 0.27 | −0.62 | 1.24 | −1.41 | −0.87 |

The results shown in Tables 9 and 10, reflect the following:

(1) The level of colloidal silica has little effect on the PSD/PS, but it can effectively influence the extent of expansion. A smaller amount of silica results in better expansion. Its effect on the particle size was not that significant, but higher amounts of silica would decrease the particle size. This observation is consistent with the reported results of Kang, (Ming-Huang J. Kang, Ph.D. dissertation, Lehigh University, 1986), which showed a decrease in particle size with increased amount of colloidal silica.

(2) The Ludox®/PVAm ratio showed the combined effect of the amount of colloidal silica and PVAm. When the ratio was high (lower amount of PVAm for a fixed amount of Ludox®, or a higher amount of Ludox® for a fixed amount of PVAm), the resulting microspheres had a larger particle size, narrower size distribution, and higher extent of expansion.

(3) The level of salt did not affect the particle size and expansion ratio, but apparently broadened the particle size distribution and increased the onset temperature of both expansion and shrinkage.

(4) Ethanol, with its lower solubility parameter, was helpful for producing larger particles and better expansion, while butanol had the opposite effect. An increased amount of ethanol resulted in the formation of larger particles and had little effect on expansion within the range from 2 to 6 g alcohol. However, an increased amount of butanol did not result in the formation of larger particles or improve the expansion. This observation, i.e. that the alcohol with higher solubility parameter does not favor increasing particle size, its distribution and expansion, is the opposite of the results obtained from the comparison of methanol and hexanol.

Further Examples 48-53 reflect characteristics of the $H_2O_2$ treatment using an impeller to agitate the mixture at various agitation speeds. The Examples include two types of samples: dry particles after filtration and original slurry taken directly from the reactor. For dry particles, 30 g dry particles were mixed with 45 g DI water and the mixture was treated with 0.7 g 35% $H_2O_2$ solution at 50° C. for 3.5 hr. For original slurry, 75 g were taken for further treatment.

TABLE 11

Comparison of Expansion Behavior and the Appearance of
Hydrogen Peroxide Treated Particles for Various Treatment Conditions.

| Ex. | Dispersion | Mixing | RPM | Expd. Vol. (mL) | $T_{o.e.}$ | Particle appearance and behavior |
|---|---|---|---|---|---|---|
| 48 | V1500 | Dry particles | Impeller | 1500 | 5.0 | 73 | All transparent; 100% expanded |
| 49 | V600 | Dry particles | Impeller | 600 | 5.0 | 72 | All transparent; 100% expanded |
| 50 | V200 | Dry particles | Impeller | 200 | 3.3 | 73 | Most are transparent; opaque microspheres cannot expand |
| 51 | VO1500 | Original slurry | Impeller | 1500 | 4.0 | 73 | Most are transparent; opaque microspheres cannot expand |
| 52 | VT | Dry particles | B.P.* | N/A | 3.0 | 73 | Most are transparent |
| 53 | VOT | Original slurry | B.P.* | N/A | 0.8 | 90 | All are opaque; No apparent expansion |

*bottle polymerization unit (30 rpm)

Table 11 reflects the following:
(1) The slurries made from dry particles resulted in better expansion, as shown by comparing VT/VOT and V1500/VO1500. This may be due to the presence of ingredients in the original slurry, which can decompose the hydrogen peroxide.
(2) Treatment in a bottle polymerization unit is not as efficient as that obtained by agitation with an impeller. If it is assumed that the end-over-end method of the bottle polymerizer can give sufficient mixing, then the results show that shearing the dispersion is critical to remove impediments to expand.
(3) A higher agitation speed (RPM) can result in better expansion. The higher RPM produces a larger shear force and better mixing.
(4) Though the mechanism of surface treatment is not known with certainty, the hydrogen peroxide most likely removes the colloidal silica sitting on the particle surface, which make the particles opaque before treatment and impede the particle expansion.

The above examples reflect that the type and level of alcohol, and the amount of PVAm effect the dispersion stability and microsphere properties. Examples 54-69 as shown in Table 12 further demonstrate these effects. In Examples 54-69, the amount of Ludox® (35 wt % of colloidal silica) was held constant at 22 g, and the amount of NaCl was maintained at 4 g, $Na_2Cr_2O_7$ (wt 2.5%) was 3.40 g, and DI water was 200 g as well. The composition of the oil phase is the same as that found in the standard recipe. The results are collected in Table 13.

It is clearly seen that an increase in the amount of ethanol will broaden the absolute particle size distribution, but in terms of the relative distribution, this is not necessarily true. In spite of the complexity, in every four samples with the same amount of PVAm (e.g. CM01-CM04, PVAm=0.05 g) the microspheres with the narrowest relative distribution always had the best expandability. This observation revealed the relation between the size uniformity and the expandability of the microspheres. A relatively larger expanded volume would be obtained if the particle size were more uniform, due to the higher efficiency of packing. The examples prepared with more ethanol began expanding and shrinking at lower temperatures, which revealed that the ethanol might not only decrease the interfacial tension of the droplet to make larger particles, but also change the composition of the particle shell.

TABLE 12

Examples 54-69 Varying Ethanol and PVAm in the Aqueous Phase

| Example | 54 | 55 | 56 | 57 | 58 | 59 | 60 | 61 |
|---|---|---|---|---|---|---|---|---|
| Sample | CM01 | CM02 | CM03 | CM04 | CM05 | CM06 | CM07 | CM08 |
| Ethanol(g) | 1 | 3 | 5.5 | 8 | 1 | 3 | 5.5 | 8 |
| PVAm(g) | 0.05 | 0.05 | 0.05 | 0.05 | 0.10 | 0.10 | 0.10 | 0.10 |

| Example | 62 | 63 | 64 | 65 | 66 | 67 | 68 | 69 |
|---|---|---|---|---|---|---|---|---|
| Sample | CM09 | CM10 | CM11 | CM12 | CM13 | CM14 | CM15 | CM16 |
| Ethanol(g) | 1 | 3 | 5.5 | 8 | 1 | 3 | 5.5 | 8 |
| PVAm(g) | 0.15 | 0.15 | 0.15 | 0.15 | 0.20 | 0.20 | 0.20 | 0.20 |

TABLE 13

Effect of Amount of Ethanol and PVAm

| Ex. | Sample | PS (µm) | PSD (µm) | PSD/PS | Expd. Vol. (mL) | $T_{o.e.}$ (°C.) | $T_{t.e.}$ (°C.) | $T_{o.s.}$ (°C.) | $T_{t.s.}$ (°C.) |
|---|---|---|---|---|---|---|---|---|---|
| 54 | CM01 | 14.8 | 5.37 | 0.363 | 3.0 | 77 | 96 | 102 | 106 |
| 55 | CM02 | 16.1 | 6.68 | 0.415 | 7.2 | 75 | 94 | 103 | 111 |
| 56 | CM03 | 22.9 | 6.40 | 0.279 | 8.7 | 72 | 90 | 94 | 104 |
| 57 | CM04 | 47.2 | 21.8 | 0.462 | 2.0 | 68 | 80 | 83 | 94 |
| 58 | CM05 | 14.8 | 5.36 | 0.362 | 6.5 | 75 | 94 | 106 | 113 |
| 59 | CM06 | 16.8 | 6.77 | 0.403 | 8.4 | 75 | 94 | 104 | 109 |
| 60 | CM07 | 21.2 | 7.34 | 0.346 | 10.5 | 72 | 75 | 96 | 105 |
| 61 | CM08 | 31.0 | 15.0 | 0.484 | 5.4 | 67 | 72 | 86 | 93 |
| 62 | CM09 | 15.6 | 5.63 | 0.361 | 7.7 | 76 | 95 | 107 | 113 |
| 63 | CM10 | 17.8 | 7.01 | 0.394 | 9.6 | 73 | 77 | 104 | 109 |

TABLE 13-continued

Effect of Amount of Ethanol and PVAm

| Ex. | Sample | PS (μm) | PSD (μm) | PSD/PS | Expd. Vol. (mL) | $T_{o.e.}$ (°C.) | $T_{t.e.}$ (°C.) | $T_{o.s.}$ (°C.) | $T_{t.s.}$ (°C.) |
|---|---|---|---|---|---|---|---|---|---|
| 64 | CM11 | 20.9 | 6.91 | 0.331 | 10.6 | 71 | 75 | 96 | 105 |
| 65 | CM12 | 24.3 | 8.77 | 0.361 | 9.3 | 68 | 73 | 90 | 100 |
| 66 | CM13 | 13.8 | 5.12 | 0.371 | 8.7 | 75 | 77 | 103 | 116 |
| 67 | CM14 | 17.3 | 6.41 | 0.371 | 10.9 | 73 | 76 | 100 | 110 |
| 68 | CM15 | 22.1 | 6.04 | 0.273 | 11.0 | 69 | 74 | 95 | 116 |
| 69 | CM16 | 22.4 | 5.98 | 0.267 | 10.2 | 69 | 74 | 94 | 125 |

Figure 6:
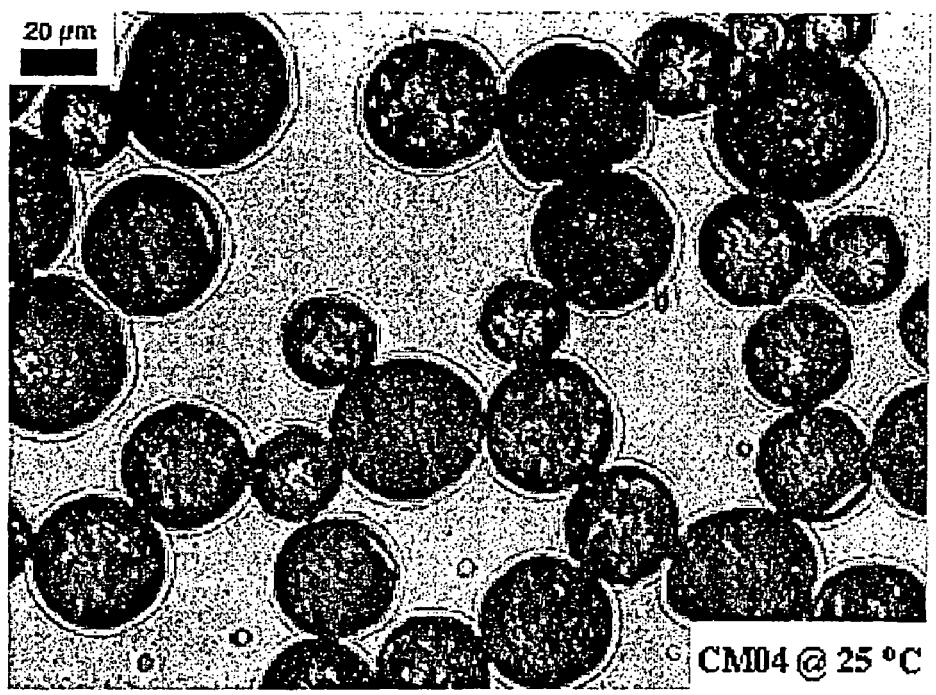
FIG. 6 is a photograph of Example 57 microspheres from CM04 sample before expansion.

*The expansion of the microspheres was measured in graduated tubes at 80° C., the amount of air dried microspheres was 0.2 g, and the maximum expanded volume of the microspheres (Expd. Vol.) was used to define the expandability of the microspheres.
**$T_{o.e.}$ = onset temperature of expansion
$T_{t.e.}$ = termination temperature of expansion
$T_{o.s.}$ = onset temperature of shrinkage
$T_{t.s.}$ = termination temperature of shrinkage At the highest alcohol level, the particles had a honeycomb structure, which contained smaller particles therein, (as shown in FIG. 6). The honeycomb structure is undesirable in this project due to the impairment of the thermal expansion and mechanical properties. The particle size increased with the amount of ethanol, and this effect was weakened when the level of PVAm in the system was high, as shown in FIG. 1. This is consistent with the former observations that an increased PVAm amount results in the formation of smaller particles with narrower distributions. $PVA_m$ acted similarly to a surfactant, which can stabilize the smaller droplets.

In order to find an actual recipe for microspheres having a desired particle size and expansion properties, (i.e. expanding within a narrow range of temperatures, excellent expandability, and holding gas at high temperature), a contour plotting technique can be used to analyze the partitioning in 3-D space with respect to the amount of PVAm and ethanol. By using this technique, linear extrapolation is used between experimental points to obtain intermediate values, and those similar values can be connected to yield isocontour lines.

Figure 2:
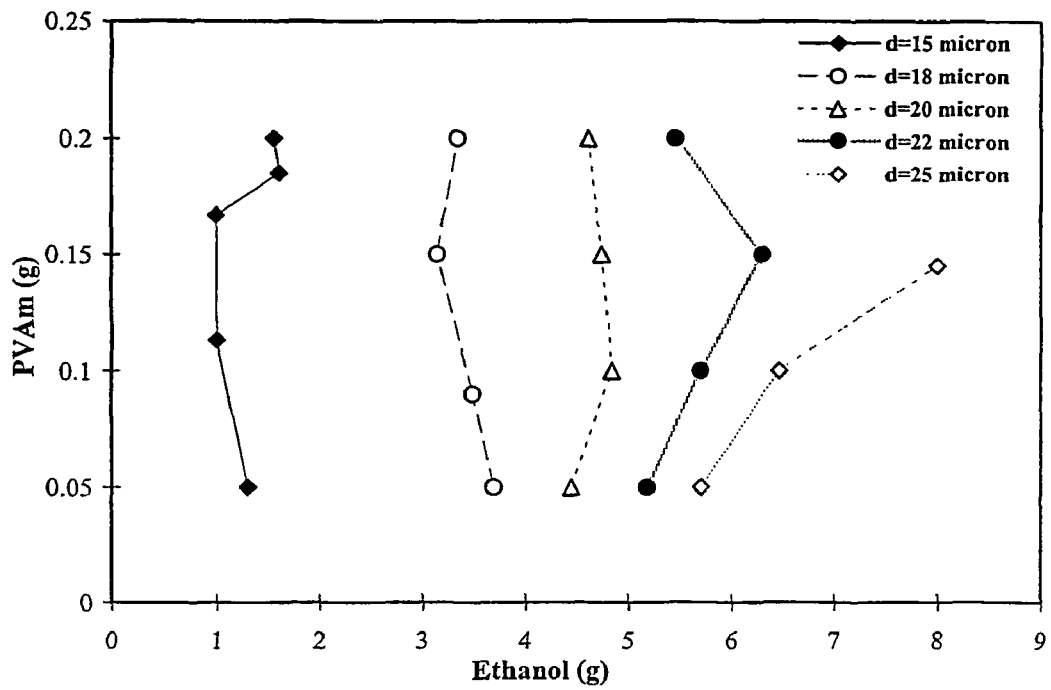
FIG. 2 is a contour plot showing the particle size with respect to the amount of PVAm and ethanol.

FIG. 2 shows that, compared to ethanol, the amount of PVAm is not the most important parameter to control the particle size, but when the level of ethanol is high, suitable amounts of PVAm can be added to weaken its influence.

Figure 3:
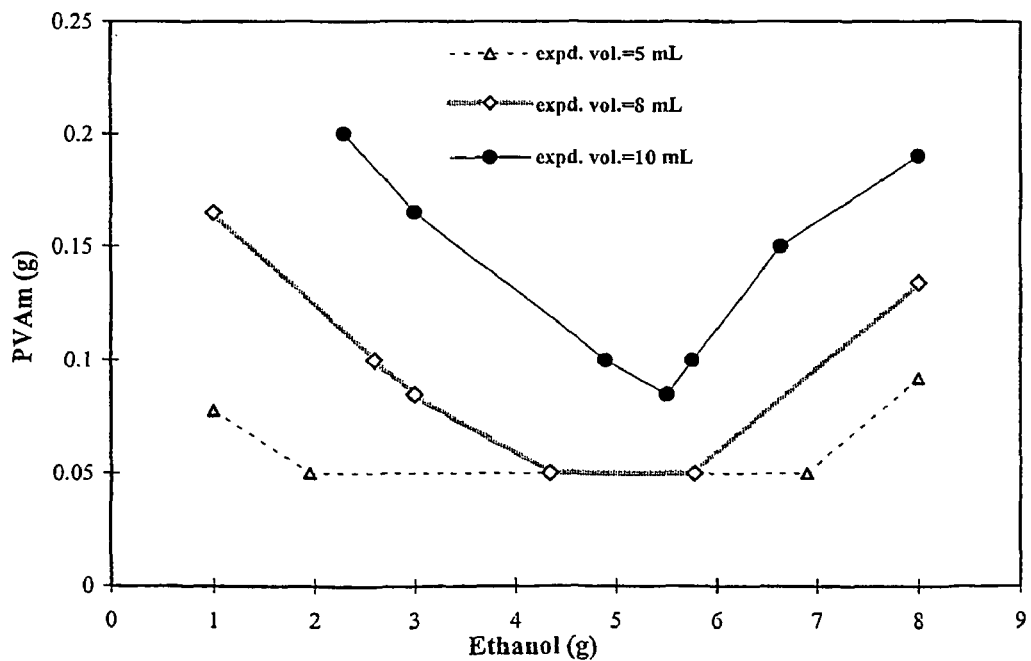
FIG. 3 is a contour plot showing the expanded volume of 0.2 g microsphere powder measured at $80°$ C.

The contour plot in FIG. 3 shows the expanded volume of the particles with respect to the amount of PVAm and ethanol. FIG. 3 shows that the amount of ethanol and PVAm had a combined effect on the expansion. Adjustment of both parameters achieves the maximum expansion at an optimum point or, most likely, an optimum region. Points yielding the same expanded volumes that were 5, 8 and 10 mL respectively, were found and connected to obtain three isotherms. An increase in the amount of PVAm improves the expandability of the microspheres, but when the amount of ethanol is increased, the expanded volume first increases to achieve a maximum with a medium amount of ethanol, and then decreases.

The expansion process was recorded under a microscope with a hot stage attachment and photographed. The visual observation of the microspheres heated by the hot stage revealed that the particle expansion had five stages:

(1) The microspheres held their shape and did not expand before $T_{o.e.}$.
(2) When the temperature approached $T_{o.e.}$, the isopentane core vaporized and expanded the shell. Generally the larger spheres began expansion earlier than the smaller one. Sometimes some particles could hold their shape up to 85° C. However, it is desirable that the particles complete expansion over a narrow range of temperature.
(3) After the expansion was completed, the particles would maintain their shape until $T_{o.s.}$. It is desirable that the particles have a high $T_{o.s.}$.
(4) The particles begin losing gas when reaching $T_{o.s.}$. Some become smaller gradually and some break abruptly like balloons.
(5) If the temperature is increased further, the particles lose all their gas and melt.

Figure 4:
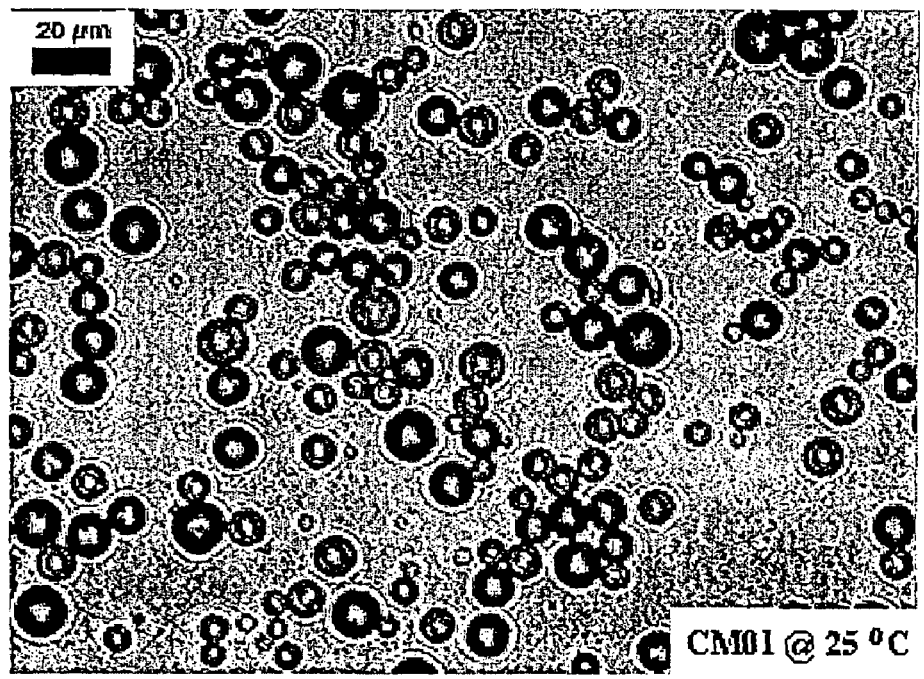
FIG. 4 is a photograph of Example 54 microspheres from CM01 sample before expansion.
Figure 5:
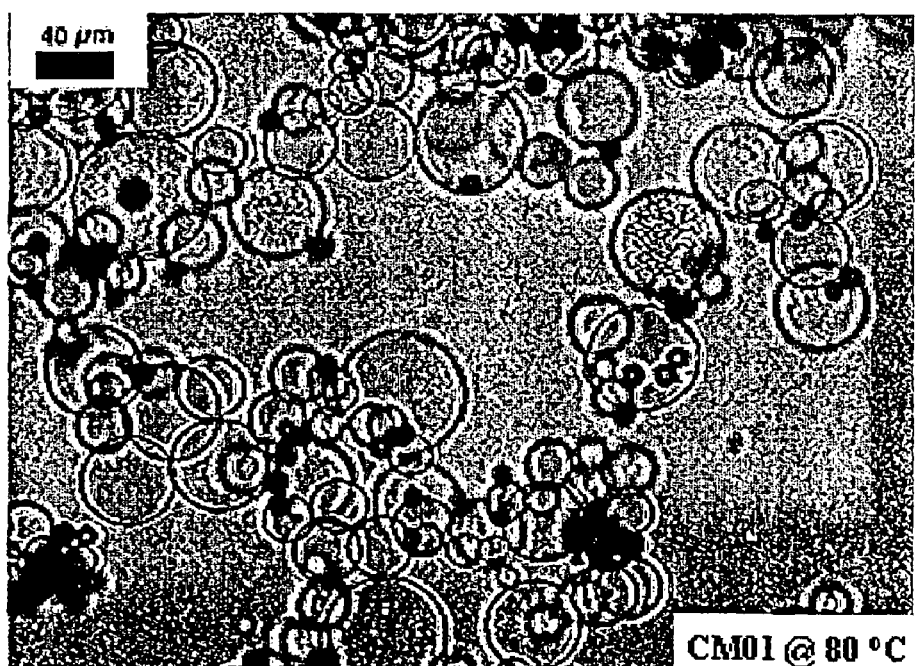
FIG. 5 is a photograph of Example 54 microspheres from CM01 sample after expansion.

FIGS. 4 and 5 show the particles from Example 54, sample CM01 (Expd.Vol.=3.0 mL) before and after expansion, it was found that the particle size was relatively small, (i.e. d=10 μm) and upon heating some particles did not expand (black particles).

Figure 7:
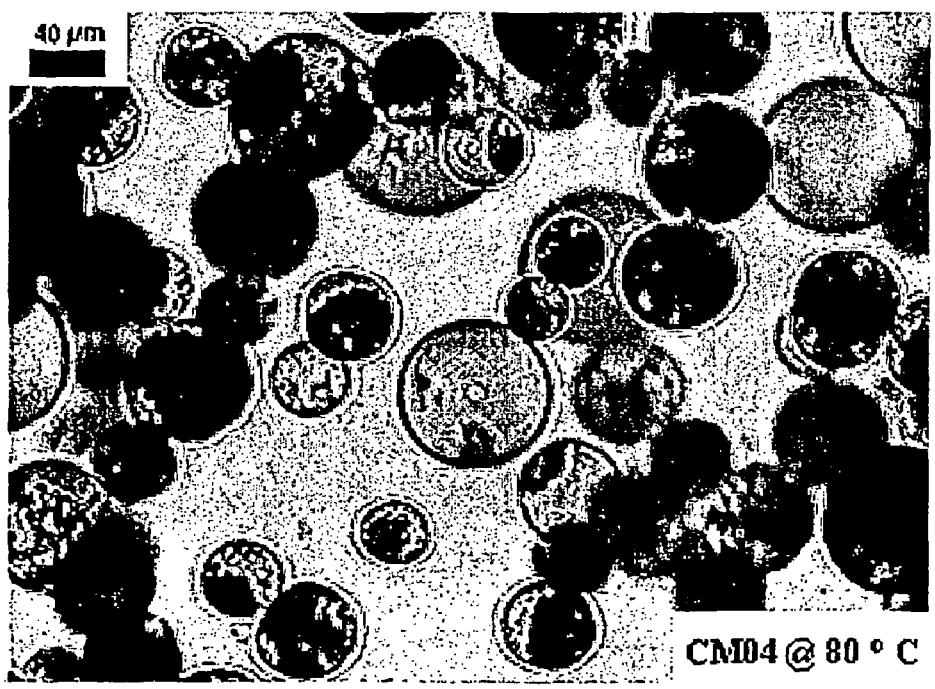
FIG. 7 is a photograph of Example 57 microspheres from CM04 sample after expansion.

FIGS. 6 and 7 are for the particles from Example 57, sample CM04 (Expd.Vol.=2.0 mL), which had highest amount of ethanol and lowest level of PVAm. A so-called honeycomb structure was found in these large particles (d=48 μm). These microspheres began expansion at a lower temperature, and due to the fast shrinkage after expansion, they did not result in a satisfactory expansion at 80° C.

Figure 8:
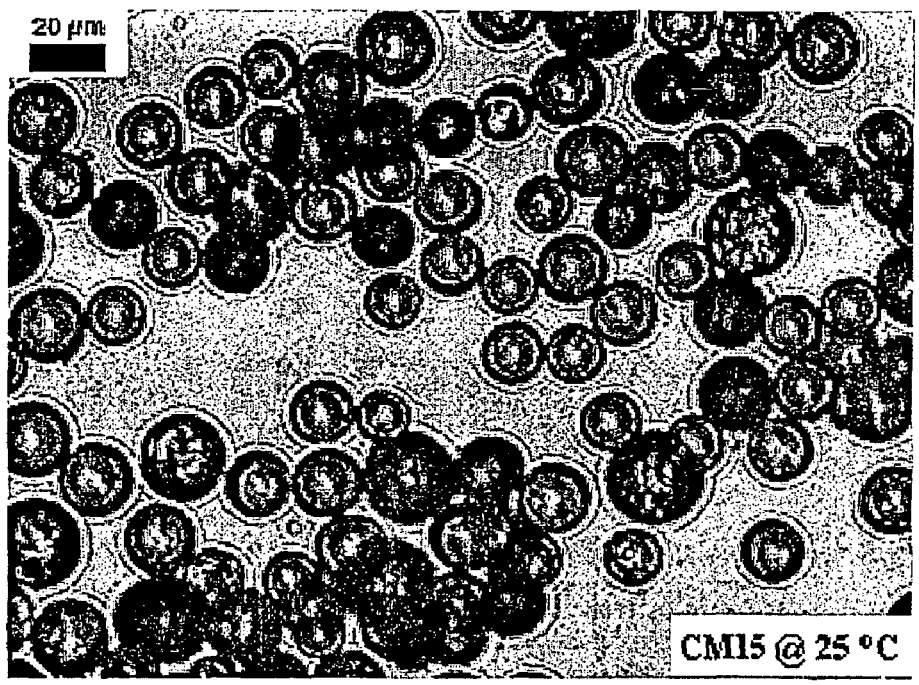
FIG. 8 is a photograph of Example 68 microspheres from CM15 sample before expansion.
Figure 9:
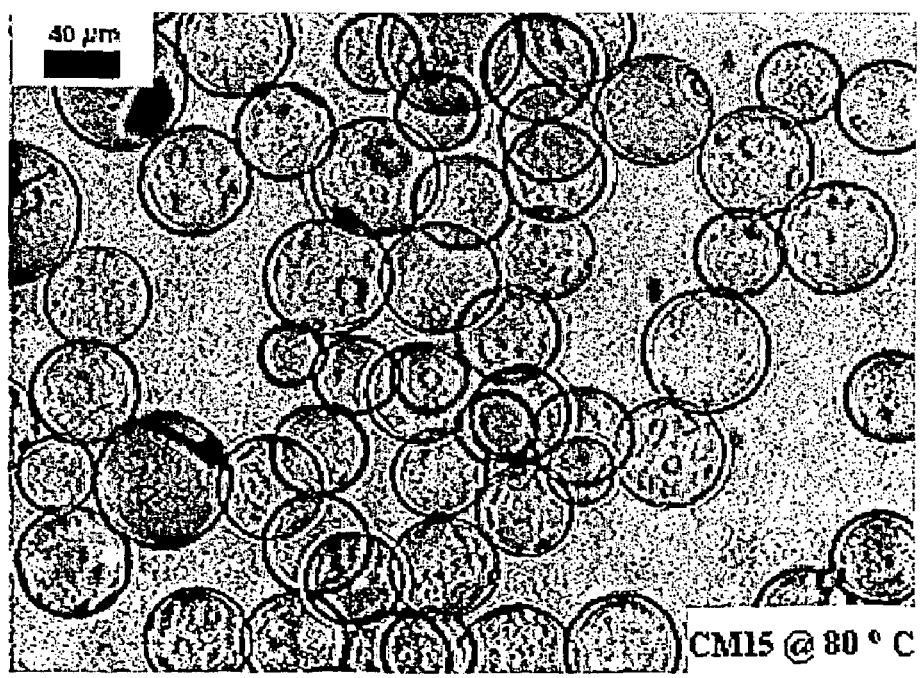
FIG. 9 is a photograph of Example 68 microspheres from CM15 sample after expansion.

The images of microspheres from Example 68, sample CM15 are shown in FIGS. 8 and 9, which clearly show that the size of these microspheres is intermediate, around 20 μm and more uniform. We could also see the liquid droplets through the transparent particle shells. These particles could totally expand and resulted in excellent expansion.

Examples 18-69 reflect that the composition of the aqueous phase has a great effect on the morphology and expansion properties of the microspheres. The amount and type of alcohol used in the suspension polymerization recipe had the most significant effect. Methanol, and ethanol increased the particle size and narrowed the particle size distribution. A suitable amount of methanol or ethanol brings about a sharp expansion of the particles during heating resulting from the uniformity of the particle properties. However, too much methanol or ethanol will produce particles with a honeycomb structure, which do not maintain the particle integrity at higher temperatures, and lead to a poor expansion. The use of butanol did not improve the thermal-expansion properties. The use of higher amounts of poly(vinyl amine) (PVAm), which acted as a steric stabilizer together with the colloidal silica, produced microspheres that were smaller and more uniform in size. However, the molecular weight of poly(vinyl amine) did not affect the particle properties. The amount of Ludox® colloidal silica had little effect on the particle size and size distribution, but it did affect the degree of expansion of the particles. Smaller amounts of Ludox® resulted in better expansion. The level of salt did not have any effect on the particle size, but it did broaden the particle size distribution and increased the onset temperature of both expansion and shrinkage.

A higher agitation speed during the preparation of the suspension produced particles with a narrower size distribution. This may be attributed to the narrower initial droplet size distribution obtained in the emulsification process. The agitation time had little effect on the particle size, but it appeared to narrow the particle size distribution.

The presence of shear during $H_2O_2$ surface treatment enhanced the expansion properties of the particles. Air-dried particles had a better expansion after $H_2O_2$ surface treatment compared to the original slurry taken directly from the reactor.

Foam Including Polymeric Microspheres

Figure 10:
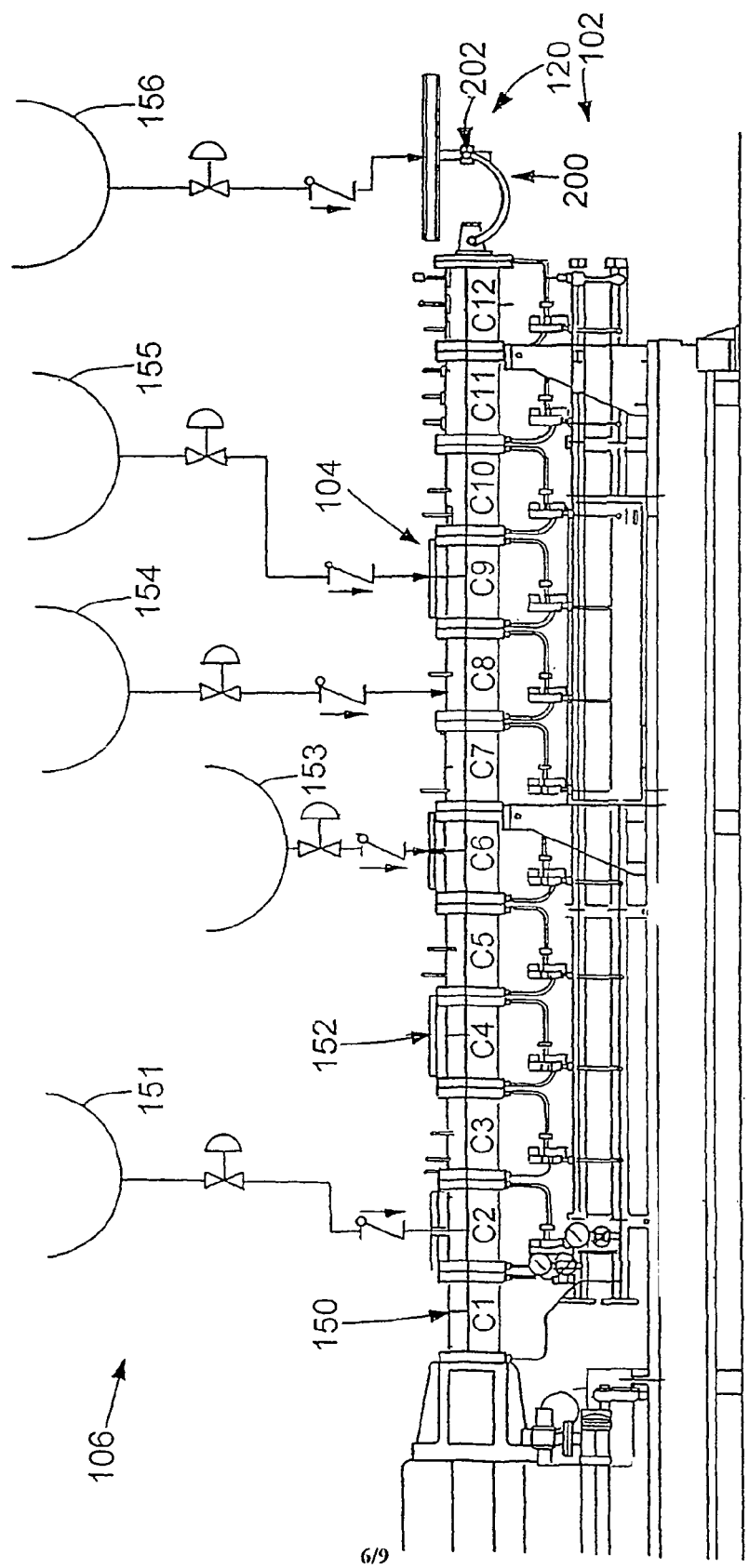
FIG. 10 is a schematic illustration of an apparatus for extruding polymer foam, or dispersions for use in making such foam, in accordance with the teachings of the present invention.

Foams in accordance with the present invention are preferably manufactured using an extruder, such as the extruder system 102 schematically illustrated in FIG. 10. Use of the extruder provides the best results, but other conventional mixing methods may be used.

The extrusion system 102 includes a single or twin screw extruder 104 and an associated reservoir system 106. The extruder 104 includes a series of barrels C1-C12 and an extruder head 120. Preferably a twin screw extruder is employed such as described in U.S. Pat. No. 5,723,506.

The reservoir system 106 includes a plurality of reservoirs 150-156 from which the foam components are supplied. The reservoirs 150-156 feed the foam component materials to the barrels C1-C12 and head 120 of the extruder 104 via a network of feed lines and valves as illustrated.

In manufacturing foam using the extrusion system of FIG. 10, polymeric microspheres are preferably provided to the extruder 104 at barrel C1 from a fill station 150 using a side fill feeder which provides a metered flow of unexpanded microspheres to the screw of the extruder. Due to the light weight of the microspheres, using a gravity feed can be problematic so a side fill feeder is preferred. Additional microspheres are preferably provided to the extruder 104 at barrel C4 from a fill station 152. Overall, at least 10% by weight, normally more than 25% by weight, of the expandable microspheres which encapsulate a non-halogenated hydrocarbon chemical or a non-halogenated hydrocarbon chemical blend as a primary blowing agent are preferably added.

For best results, it is preferred to use two different average sizes of microspheres when making boardstock or bunstock foam to enhance structural rigidity and strength. The larger size microspheres are preferably introduced first at barrel C1 and the relatively smaller microspheres are preferably introduced at barrel C4.

Preferably, the total microsphere component of the foam is 50% of the larger microspheres and 50% of the smaller microspheres by weight. This range may be varied from 30/70 to 70/30 so that at least 30% of the microspheres have a relatively small average unexpanded diameter with a standard deviation less than 3 microns and at least 30% of the microspheres have a relatively large average unexpanded diameter with a standard deviation less than 9 microns. The unexpanded diameter of the larger microspheres is preferably at between 10 and 200 microns least and is 1.5 times greater than the unexpanded diameter of the smaller microspheres. The foam may have at least 45% of the microspheres having the smaller average unexpanded diameter with a standard deviation less than 2 microns and at least 45% of the microspheres having the larger average unexpanded diameter with a standard deviation less than 8 microns where the larger diameter is between 10 and 100 microns and is at least two times greater than the smaller diameter. Microspheres having a heat activatable crosslinking agent and/or a surface functionalization agent are preferred, particularly those receiving a hydrogen peroxide treatment to remove silica on the polymer shells.

In one example, the smaller microspheres had an average unexpanded diameter of between 6-7 microns with a standard deviation less than 2 microns and the larger microspheres had an average unexpanded diameter of 14 microns with a standard deviation less than 3 microns. In another example, the smaller microspheres had an average unexpanded diameter of between 6-7 microns with a standard deviation less than 2 microns and the larger microspheres had an average unexpanded diameter of 19 microns with a standard deviation less than 3 microns.

Isocyanate solution is preferably mixed and fed to barrels C2 and C6 of the extruder 104 from reservoirs 151 and 153. The isocyanate solution may be optionally pre-mixed with a dispersing agent and/or surfactant at reservoirs 151 and 153 and provided to the extruder 104 with the isocyanate at barrels C2 and C6.

Polyol is preferably provided from a reservoir 155 and fed to the extruder 104 at barrel C9. Surfactant, curing agent and foaming agent is preferably pre-mixed with the polyol contained in the reservoir 155 and fed to the extruder 104 at barrel C9.

The primary blowing agent is encapsulated within the microspheres. As such, the microspheres themselves function as a blowing agent as they expand during the foam making process. However, additional, non-encapsulated foaming or blowing agents can be used, preferably no more than 2% by weight as reflected in the preferred formulations, FIGS. 12 and 13. More preferably, less than 1% by weight of non-encapsulated blowing agent is used in the manufacture of the inventive foam. The preference for little or no non-encapsulated blowing agent readily permits the use of highly flammable non-halogenated hydrocarbons without the need to take extra explosive proofing precautions for the manufacturing site. However, using the microspheres functionally as a blowing agent is advantageous even if the microspheres are not the primary blowing agent.

When used, supplemental foaming and/or blowing agents are preferably provided from a reservoir 154 and fed to the extruder 104 at barrel C8 without previous mixing with other components. Additionally, supplemental foaming and/or blowing agents may be mixed with the polyol at reservoir 155 prior to entry to the extruder 104 at barrel C9. For example, foaming agent is provided to extruder 104 at barrel C9 after the foaming agent is first mixed with a polyol/surfactant mixture.

Fire retardants such as polymeric phosphate and brominated-ester are preferably pre-mixed with the polyol at reservoir 155 prior to entry to the extruder 104 at barrel C9.

Figure 11:
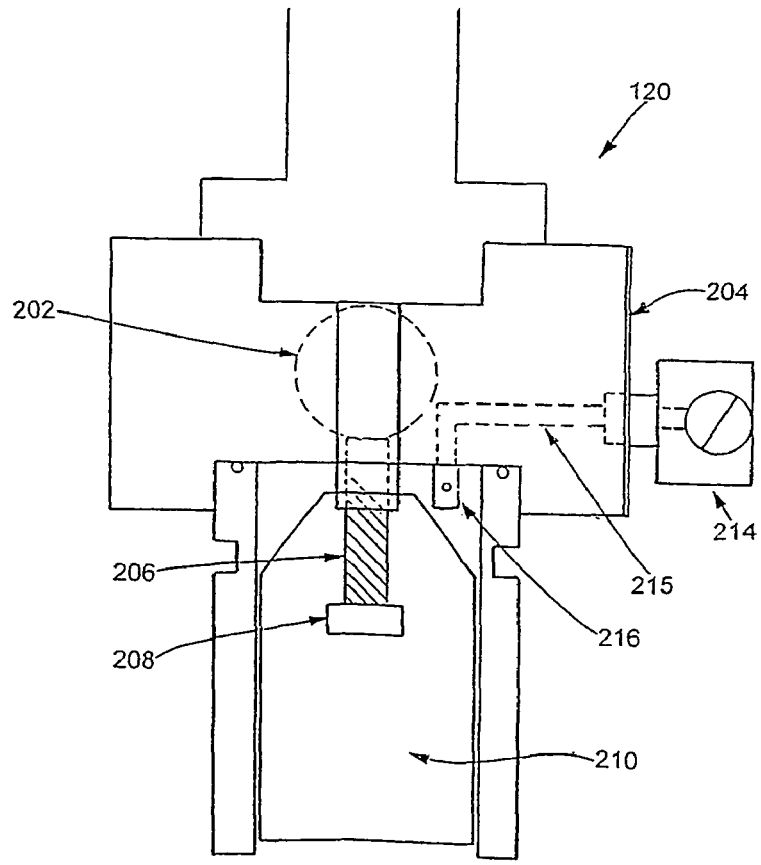
FIG. 11 is a cross-sectional side view of the extruder head of the extruder of FIG. 10.

Catalyst is preferably introduced into the extruder 104 via an extruder head 120 from reservoir 156. A cross-sectional side view of the extruder head 120 of the extrusion system is shown in FIG. 11.

In making foam, the mixture of the component parts of the unexpanded polymeric microspheres, isocyanate, polyol, and additional materials, without the catalyst, arrives via a hose 200 (shown in FIG. 10) to an entry port 202 in a mixing block 204 of the extruder head 120. At mixing block 204, the component mixture travels via a worm gear 206 to agitator 208 located in a cavity area 210. Concurrently, catalyst enters at a catalyst port 214 and travels along a duct 215 to arrive in the cavity area 210 via a catalyst entry port 216. The mixture of the component parts of the expandable microspheres, isocyanate, polyol and additional agents and catalyst are mixed together by agitator 208 in the cavity area 210 and continues out of the cavity area 210, preferably onto a conveyor system such as the conveyor illustrated in U.S. Pat. No. 5,723,506. Preferably, the cavity 210 is 2 to 3 inches wide and the agitator is rotated at approximately 3500 to 5500 rpm.

The conveyor may optionally apply facer material to one or both sides of the foam. As the extruded mixture is deposited on the conveyor, the heat of the reaction causes the microspheres to expand. Additional heat can be applied by the conventional type of conveyor system which transports the foam through a heated chamber for curing.

A preferred method of manufacturing foam using the extruder of FIG. 10 includes feeding relatively large polymeric microspheres from source 150 to the extruder 104 at barrel C1. A mixture of isocyanate, dispersing agent and surfactant is fed to the extruder 104 at barrel C2 from reservoir 151. Additional microspheres, preferably of a smaller average diameter, which may optionally be mixed with graphite particles and/or carbon-black, are added from source 152 and fed to the extruder 104 at barrel C4. An additional mixture of isocyanate, dispersing agent and surfactant is then added to the extruder 104 at barrel C6 from reservoir 153. Blowing agent is provided to the extruder 104 at barrel C8 from reservoir 154. Polyol, foaming and blowing agent, surfactant and curing agent are fed to the extruder 104 at barrel C9 from reservoir 155. Finally, a catalyst or catalyst mixture is provided to the extruder head 120 from reservoir 156.

The production of foams based on isocyanates is known per se and is described, for example, in German Offenlegungsschriften 1,694,142, 1,694,215 and 1,720,768, as well as in Kunststoff-Handbuch [Plastics Handbook], Volume VII, Polyurethane, edited by Vieweg and Hochtlen, Carl Hanser Verlag, Munich 1966, and in the new edition of this tome, edited by G. Oertel, Carl Hanser Vedag, Munich, Vienna, 1983.

These foams are mainly those that comprise urethane and/or isocyanurate and/or allophanate and/or uretdione and/or urea and/or carbodiimide groups. Preferred starting components include aliphatic, cycloaliphatic, araliphatic, aromatic and heterocyclic polyisocyanates, such as those described, for example, by W. Siefken in Justus Liebigs Annalen der Chemie, 562, pp. 75-136, for example, those of the formula

in which n denotes 2-4, preferably 2-3, and Q denotes an aliphatic hydrocarbon radical of 2-18, preferably 6-10 carbon atoms, a cycloaliphatic hydrocarbon radical of 4-15, preferably 5-10 carbon atoms, an aromatic hydrocarbon radical of 6-15, preferably 6-13 carbon atoms or an araliphatic hydrocarbon radical of 8-15, preferably 8-13 carbon atoms, for example, such polyisocyanates as described in DE-OS 2,832, 253, pp. 10-11.

Particularly preferred are usually those polyisocyanates which are technically readily accessible, for example, the 2,4 and 2,6-toluylene diisocyanate as well as any mixture of these isomers ("TDI"); polyphenyl5 polymethylenepolyisocyanates, such as those obtained by an aniline formaldehyde condensation and subsequent treatment with phosgene ("crude MDI"), and polyisocyanates comprising carbodiimide groups, urethane groups, allophanate groups, isocyanurate groups, urea groups or biuret groups ("modified polyisocyanates"), especially those modified polyisocyanates which are derived from 2,4- and/or 2,6-toluylene diisocyanate and from 4,4'- and/or 2,4'-diphenylmethane diisocyanate.

The starting components may further be compounds of a molecular weight usually of 400 to 10,000, containing at least two hydrogen atoms reactive toward isocyanates. These comprise, besides compounds containing amino, thio, or carboxyl groups, preferably compounds containing hydroxyl groups, in particular compounds containing 2 to 8 hydroxyl groups, especially those of a molecular weight of 1,000 to 6,000, preferably 2,000 to 6,000, for example polyethers and polyesters as well as polycarbonates and polyester amides containing at least 2, usually 2 to 8, preferably 2 to 6 hydroxyl groups; these compounds are known per se for the preparation of homogenous and cellular polyurethanes and are disclosed, for example in DE-OS 2,832,253, pp. 11-18.

When appropriate, compounds comprising at least two hydrogen atoms reactive toward isocyanates and of a molecular weight of 32 to 399 may be used as further starting components. Also, in this case, compounds containing hydroxyl groups and/or amino groups and/or thiol groups and/or carboxyl groups, preferably compounds containing hydroxyl groups and/or amino groups, are understood to be those which are used as chain lengtheners or crosslinking agents. These compounds usually have 2 to 8, preferably 2 to 4 hydrogen atoms reactive toward isocyanates. Appropriate examples are disclosed in DE-OS 2,832,253, pp. 19-20. Other examples of polyisocyanates and polyols useful in the invention are described in U.S. Pat. No. 5,149,722, co-owned by the assignee of the present invention and incorporated herein by reference as if fully set forth.

Blowing agents which may be used to make foam include water and/or readily volatile inorganic or organic substances and other auxiliary volatile blowing agents typically used to blow PUR/PIR foams. Water, however, used in small quantities serves as a foaming agent where other blowing agents are used.

Organic blowing agents include acetone, ethylacetate; halogen-substituted alkanes, such as methylene chloride, chloroform, ethylidene chloride, vinylidene chloride, monofluoro trichloromethane, chlorodifluoromethane, dichlorodifluoromethane, dichlorodifluoroethane, dichlorotrifluoroethane; also halogenated and non-halogenated hydrocarbon blowing agents.

Specific examples of non-halogenated hydrocarbon blowing agents include: pentane, butane, hexane, heptane, diethyl ether, isopentane, n-pentane and cyclopentane.

Specific examples of halogenated hydrocarbon blowing agents include: 1,1,1,4,4,4-hexafluorobutane (BFC-356); 1,1-dichloro-1 fluoroethane (HFC-141/b); the tetrafluoroethanes such as 1,1,1,2-tetrafluoroethane (HFC-134a); the pentafluoropropanes such as 1,1,2,2,3 pentafluoropropane (HFC-245ca), 1,1,2,3,3-pentafluoropropane (HFC 245ea), 1,1,1,2,3-pentafluoropropane (HFC-245eb), and 1,1,1,3,3 pentafluoropropane (HFC-245fa); the hexafluoropropanes such as 1,1,2,2,3,3-hexafluoropropane (HFC-236ca), 1,1,1,2, 2,3-hexafluoro propane (HFC-236cb), 1,1,1,2,3,3-hexafluoro-propane (HFC-236ea), 1,1,1,3,3,3-hexafluoropropane (BFC-236fa); the pentafluorobutanes such as 1,1,1, 3,3-pentafluorobutane (HFC-365); and difluoroethanes such as 1,1-difluoroethane (HFC-152a).

Inorganic blowing agents are, for example, air, $CO_2$ or $N_2O$. A blowing effect may also be obtained by adding compounds which decompose at temperatures above room temperature giving off gases, such as azodicarbonamide or azoisobutyronitrile. Other examples of blowing agents may be found in Kunststoff-Handbuch, Vol. VII, by Vieweg and Hochtlen, Carl-Hanser Verlag, Munich, 1966, on pages 108 and 109, 453 to 455 and 507 to 510.

Different types of blowing agents are used in combination, but use of a non-halogenated hydrocarbon chemical as the primary blowing agent has generally been avoided due to the flammability of foams which conventionally result. Use of expandable microspheres as taught by the present invention permits the use of a non-halogenated primary blowing agent in an encapsulated form thereby making the production of foam with such material less hazardous.

When appropriate, other auxiliary agents and additives may be used at the same time, such as:
water and/or other highly volatile organic substances as propellants, i.e. foaming agents;
additional catalysts of the type known per se in amounts up to 10% by weight of the polyol component;
surface-active additives, such as emulsifiers and foam stabilizers, and
reaction retardants, for example acidic substances such as hydrochloric acid or organic acid halides, also cell regulators of the type known per se, such as paraffins or fatty alcohols or dimethylpolysiloxanes, as well as, pigments or dyes and other flame retardants of the type known per se, for example tricresyl phosphate, also stabilizers against the effect of aging and weathering, plasticizers and fungistats and bacteriostats as well as fillers such as barium sulphate, kieselguhr, carbon black, or whiting.

Other examples of surface active additives, foam stabilizers, cell regulators, reaction retardants, stabilizers, flame retardants, plasticizers, dyes, fillers, fungistats, bacteriostats to be used at the same time if appropriate, as well as details concerning the use and action of these additives are described in Kunststoff-Handbuch [Plastics Handbook], Volume VII, edited by Vieweg and Hochtlen, Carl Hanser Verlag, Munich 1966, for example on pages 103-113.

In accordance with the experimentation and testing performed by the present inventors, preferred formulations for the manufacturer of PUR/PIR board stock and bunstock are set forth in FIGS. 12 and 13, respectively. While preferred types and/or sources of the component materials are identified, these are non-limiting examples. Various other additive materials as discussed above, preferably not exceeding 100 parts by weight, may be added to the formulations set forth in FIGS. 12 and 13.

Formulations for additional examples of preferred microspheres for foam manufacture are set forth in conjunction with FIGS. 14-16. In these examples a functional monomer is used in the oil phase to functionalize the surface of the microsphere in order to promote network crosslinking within the foam. This results in an anchoring effect of the unexpanded microspheres within the foam during the foam manufacturing process which enhances foam formation and structural integrity of the final foam product which results after the microspheres have expanded.

Preferred functional monomers include glycidyl methacrylate, hydroxyethyl methacrylate, hydroxylpropyl acrylate and hydroxylpropyl methacrylate. These create alcohol functionalities on the microsphere surfaces which are reactive with isocyanates. Glycidyl methacrylate is also capable of surface hydrolysis Alcohol is introduced to the aqueous phase in addition to the use of salt, sodium chloride. The alcohol is preferably ethylene glycol.

Example 70

The general method of microsphere synthesis follows the procedures outlined in Example 10 with the aqueous phase having the components set forth in FIG. 14 and the oil phase having the components set forth in FIG. 15. In this case glycidyl methacrylate serves as the network crosslinking agent.

Example 71

The general method of microsphere synthesis follows the procedures outlined in Example 10 with the aqueous phase having the components set forth in FIG. 14 and the oil phase having the components set forth in FIG. 16. In this case hydroxylpropyl methacrylate serves as the network crosslinking agent.

What is claimed is:

1. A microsphere comprising a shell of a thermally expandable polymer that encapsulates a hollow interior containing a volatile organic material; the shell being expandable at a temperature less than 70° C. such that an expanded volume and shape is retained when heated above 100° C. and cooled to ambient temperature, the shell being impermeable to penetration by the volatile organic material and retaining the volatile organic material therein after expansion.

2. A microsphere according to claim 1 having an average unexpanded diameter of between about 1 to 200 microns.

3. The microsphere according to claim 1 wherein the thermally expandable polymer shell is a homogenous composition made from the copolymerization of unsaturated monomers.

4. The microsphere according to claim 3 wherein the monomers are selected from the group consisting of monomers of nitrile containing compounds, monomers of alkenyl aromatic compounds, monomers of acrylate compounds, monomers of methacrylate containing compounds, monomers of vinyl alkyl ester compounds, and monomers of halogenated compounds.

5. The microsphere according to claim 1 wherein the thermally expandable polymer shell contains a heat activated crosslinkable component such that the shell has a glass transition temperature that is modified after expansion by crosslinking.

6. The microsphere according to claim 1, wherein the volatile organic material is a hydrocarbon or a mixture of hydrocarbons with the range of 4 to 7 carbon atoms, with a boiling point between −60° C. and 70° C.

7. The microsphere according to claim 6 wherein the hydrocarbon or mixtures of hydrocarbons are selected from the group consisting of butane, pentane, hexane, heptane, isobutene, isopentane, neopentane, cyclopropane, cyclobutane, and cyclopropane.

8. A microsphere comprising a thermally expandable polymer shell that encapsulates a hollow interior containing a heat expandable material; and the polymer shell containing a heat activated crosslinkable component such that the polymer shell has a crosslinking temperature higher than temperature of expansion of the polymer shell;

wherein the shell is expandable at a temperature less than 90° C. such that an expanded volume and shape is retained when heated above 100° C. and cooled to ambient temperature, and the crosslinkable component crosslinks when the microspheres are heated above the crosslinking temperature such that, when cooled, the microspheres maintain an enlarged shape and are impermeable to maintain the heat expandable material therein.

9. The microsphere according to claim 8 wherein the heat expandable material is a volatile hydrocarbon and the heat activated crosslinkable component is an organic compound with one polymerizable unsaturated double bond and one functional group that is inert at low temperature and can react with each other at elevated temperature to form a crosslinked network in the shell polymer.

10. The microsphere according to claim 8 wherein the heat activated crosslinkable component is selected from the group consisting of N-methylol acrylamide, -(isobutoxymethyl) acrylamide, methylolmethacrylamide, isobutoxymethylacrylamide, glycidol methacrylate, glycidyl methacrylate, glycidyl acrylate, dimethylaminoethyl methacrylate and acetoacetoxyethyl methacrylate.

11. The microsphere according to claim 8 wherein the polymer shell contains a functional monomer which functionalizes the surface of the microsphere by providing linkable surface alcohol functionalities.

12. The microsphere according to claim 1 wherein the polymer shell contains a functional monomer which functionalizes the surface of the microsphere by providing linkable surface alcohol functionalities.

13. The microsphere according to claim 12 wherein the functional monomer is selected from the group consisting of glycidyl methacrylate, hydroxyethyl methacrylate, hydroxylpropyl acrylate and hydroxylpropyl methacrylate.

14. Microspheres according to claim 1 made by reacting:
an oil phase mixture of a monomer thermoplastic, volatile organic material, cross-linking agent and free radical polymerization initiator; and
an aqueous phase mixture of water, a stabilizer of colloidal particles and an aqueous soluble free radical inhibitor.

15. Microspheres according to claim 14 wherein:
said oil phase mixture includes vinylidene chloride, acrylonitrile, methyl acrylate, triallyl cyanurate, iso-pentane, azobis(isobutyronitrile); and
said aqueous phase mixture includes deionized water, colloidal silica, NaCl, $Na_2Cr_2O_7$, poly(vinyl amine), and alcohol.

16. Microspheres according to claim 14 wherein said oil phase mixture includes a functional monomer selected from the group consisting of glycidyl methacrylate, hydroxyethyl methacrylate, hydroxylpropyl acrylate and hydroxylpropyl methacrylate.

17. Microspheres according to claim 16 wherein said aqueous phase mixture includes ethylene glycol.

18. Microspheres according to claim 14 which have been treated with hydrogen peroxide to reduce surface silica.

19. A thermally expandable microsphere comprising:
a polymer shell which encapsulates a heat expandable material;
the polymer shell containing a heat activated crosslinkable component such that the polymer shell has a crosslinking temperature higher than a temperature of expansion of the polymer shell; and
the crosslinkable component crosslinks when the microspheres are expanded by heating above the crosslinking temperature such that, when cooled, the microspheres maintain an enlarged shape and are impermeable to maintain the heat expandable material therein.

20. The thermally expandable microsphere according to claim 19 wherein the heat expandable material is a volatile hydrocarbon and the heat activated crosslinkable component is an organic compound with one polymerizable unsatured double bond and one functional group that is inert at low temperature and can react with each other at elevated temperature to form crosslinked network in the shell polymer.

21. The thermally expandable microsphere according to claim 19 wherein the heat activated crosslinkable component is selected from the group consisting of N-methylol acrylamide, -(isobutoxymethyl)acrylamide, glycidol methacrylate, glycidyl methacrylate, glycidyl acrylate, dimethylaminoethyl methacrylate and acetoacetoxyethyl methacrylate.

22. The thermally expandable microsphere according to claim 19 wherein the polymer shell contains a functional monomer which functionalizes the surface of the microsphere by providing linkable surface alcohol functionalities.

23. The thermally expandable microsphere according to claim 22 wherein the functional monomer is selected from the group consisting of glycidyl methacrylate, hydroxyethyl methacrylate, hydroxylpropyl acrylate and hydroxylpropyl methacrylate.

24. The microsphere according to claim 1, wherein the shell further comprises a heat activated cross-linking component.

25. The microsphere according to claim 24, wherein the cross-linking component has a cross-linking temperature higher than a boiling point of the volatile organic material.

26. The microsphere according to claim 25, wherein the cross-linking temperature is at least 120° C.

27. The microsphere according to claim 24, wherein the polymer shell comprises 0.5-20% by weight of the heat activated cross-linking component.

28. The microsphere according to claim 8, wherein the cross-linking temperature is at least 120° C.

29. The microsphere according to claim 8 wherein the shell expands at less than 70° C.

30. The microsphere according to claim 8, wherein the polymer shell comprises 0.5-20% by weight of the heat activated crosslinkable component.

31. The microsphere according to claim 19, wherein the cross-linking temperature is at least 100° C.

32. The microsphere according to claim 19, wherein the cross-linking temperature is at least 120° C.

33. The microsphere according to claim 19, wherein the polymer shell comprises 0.5-20% by weight of the heat activated crosslinkable component.

34. The microsphere according to claim 19 wherein the shell expands at less than 70° C.

35. A microsphere comprising a shell of a thermally expandable polymer that encapsulates a hollow interior containing a volatile organic blowing agent; the shell being expandable at a temperature less than 70° C. such that an expanded volume and shape is retained when heated above 100° C. and cooled to ambient temperature, the shell being impermeable to gas exchange and retaining the volatile organic blowing agent therein after expansion.

* * * * *